United States Patent [19]
Seto et al.

[11] Patent Number: 5,841,630
[45] Date of Patent: Nov. 24, 1998

[54] COMPACT ELECTRONIC APPARATUS HAVING BATTERY PACK DETACHABLY RETAINED BY FOUR ENGAGING PORTIONS AND LATCH MEMBER

[75] Inventors: Masaru Seto; Naohiro Yokoyama, both of Tokyo, Japan

[73] Assignee: Kabushiki Kaisha Toshiba, Kawasaki, Japan

[21] Appl. No.: 377,675

[22] Filed: Jan. 24, 1995

Related U.S. Application Data

[63] Continuation of Ser. No. 84,808, Jun. 29, 1993, abandoned.

[30] Foreign Application Priority Data

Jul. 17, 1992 [JP] Japan .................................. 4-190352

[51] Int. Cl.$^6$ .............................. G06F 1/16; H05K 7/10; H01M 2/10
[52] U.S. Cl. ......................... 361/683; 361/740; 361/747; 429/100
[58] Field of Search .............................. 429/96–100, 123; 364/708.1; 400/88; 439/341, 376, 929; 312/223.2; 361/679–686, 732, 736, 740, 747, 752, 759; 320/2, 137

[56] References Cited

U.S. PATENT DOCUMENTS

| | | | |
|---|---|---|---|
| 4,191,917 | 3/1980 | Brown et al. ................................. | 320/2 |
| 4,206,274 | 6/1980 | Peels ......................................... | 429/99 |
| 4,532,194 | 7/1985 | Liautaud et al. ........................... | 429/99 |
| 4,639,863 | 1/1987 | Harrison et al. . | |
| 4,903,222 | 2/1990 | Carter et al. ...................... | 364/708.1 X |
| 4,941,841 | 7/1990 | Darden et al. . | |
| 5,008,976 | 4/1991 | Busch . | |
| 5,030,128 | 7/1991 | Herron et al. ....................... | 361/683 X |
| 5,068,652 | 11/1991 | Kobayashi . | |
| 5,095,405 | 3/1992 | Ishida ....................................... | 361/684 |
| 5,122,927 | 6/1992 | Satou ................................... | 429/98 X |
| 5,130,892 | 7/1992 | Satou ................................... | 361/683 X |
| 5,187,643 | 2/1993 | I-Shou . | |
| 5,208,116 | 5/1993 | Joh ............................................. | 429/96 |
| 5,212,020 | 5/1993 | Inobe ..................................... | 429/96 X |
| 5,225,293 | 7/1993 | Mitchell et al. .......................... | 429/97 |
| 5,243,549 | 9/1993 | Oshiba . | |
| 5,251,105 | 10/1993 | Kobayashi et al. ...................... | 361/683 |

FOREIGN PATENT DOCUMENTS

| | | |
|---|---|---|
| 2591056 | 6/1987 | France . |
| 1784114 | 2/1958 | Germany . |
| 1774700 | 7/1958 | Germany . |
| 7819431 U1 | 10/1978 | Germany . |
| 3630698 C2 | 8/1988 | Germany . |

(List continued on next page.)

OTHER PUBLICATIONS

IBM Technical Disclosure Bulletin, vol. 28, No. 9, pp. 3877 and 3878, Feb. 1986 "Diskette Drive Single Connector, Low Power Interface".

NEC ProSpeed 386 Modular Workstation sales brochure, copyright 1988.

*Primary Examiner*—Michael W. Phillips
*Attorney, Agent, or Firm*—Limbach & Limbach, LLP

[57] ABSTRACT

A compact electronic apparatus includes a base unit having a bottom wall and a side wall, an attachment recess having a bottom opening portion formed in the bottom wall of the base unit, and a battery pack to be fitted in the attachment recess from the bottom opening portion. The battery pack has a size slightly shorter than the attachment recess and is slidable in the attachment recess by a predetermined distance substantially equal to the difference between those lengths. A side opening portion continuous to the bottom opening portion and open to the side wall is formed in one end of the attachment recess. First engaging portions are provided at the side opening portion, and second engaging portions at the far end portion of the attachment recess. The battery pack is provided with third engaging portions and fourth engaging portions, which engage with the first and second engaging portions, respectively, when the battery pack is slid in the attachment recess by the predetermined distance.

18 Claims, 15 Drawing Sheets

FOREIGN PATENT DOCUMENTS

| | | |
|---|---|---|
| 37 31 413 A1 | 3/1989 | Germany . |
| 3740108 A1 | 8/1989 | Germany . |
| 39 43 634 C2 | 5/1990 | Germany . |
| 3936261 | 5/1990 | Germany . |
| 41 14 944 A1 | 11/1991 | Germany . |
| 40 33 880 A1 | 4/1992 | Germany . |
| 22 38 916 | 6/1991 | United Kingdom . |

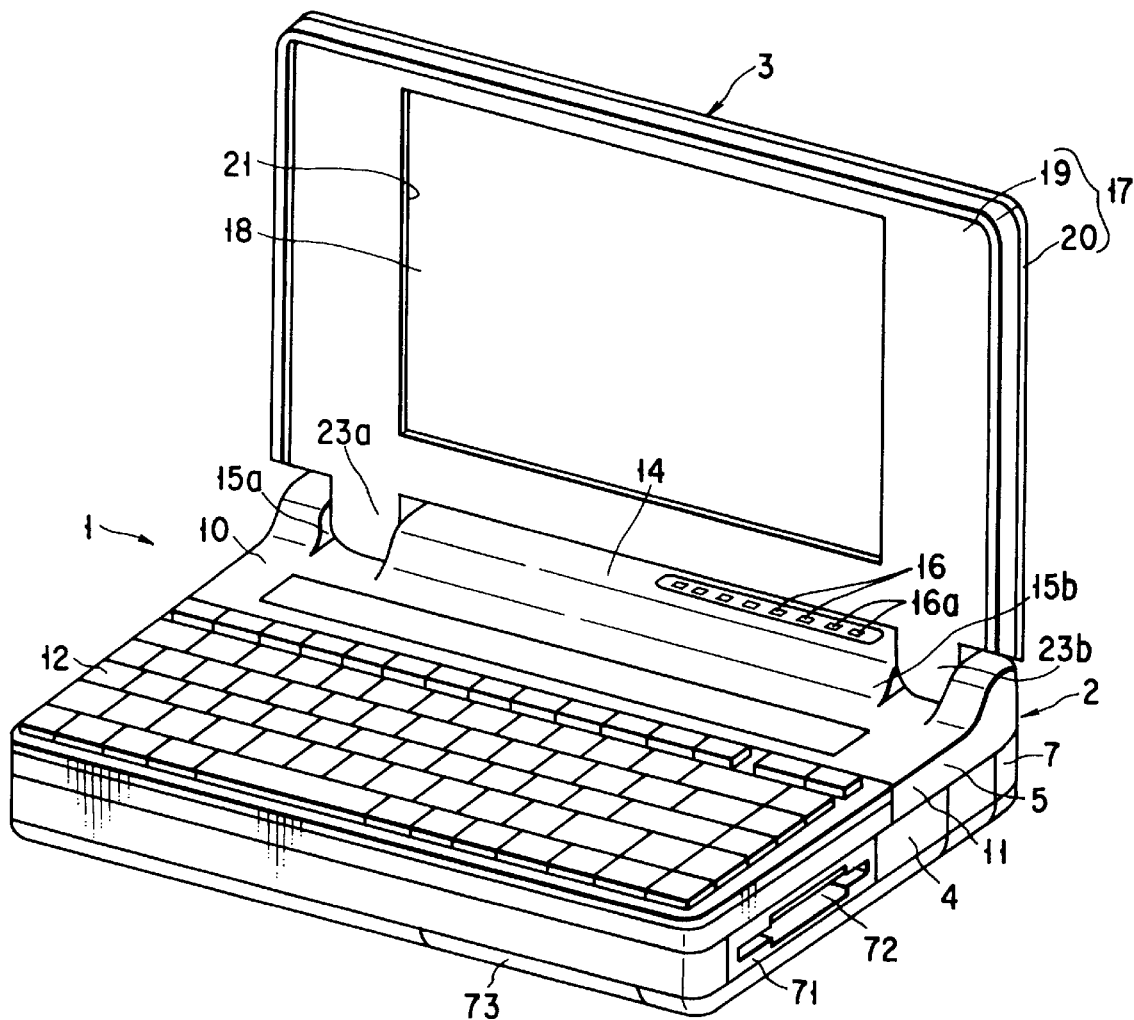
F I G. 1

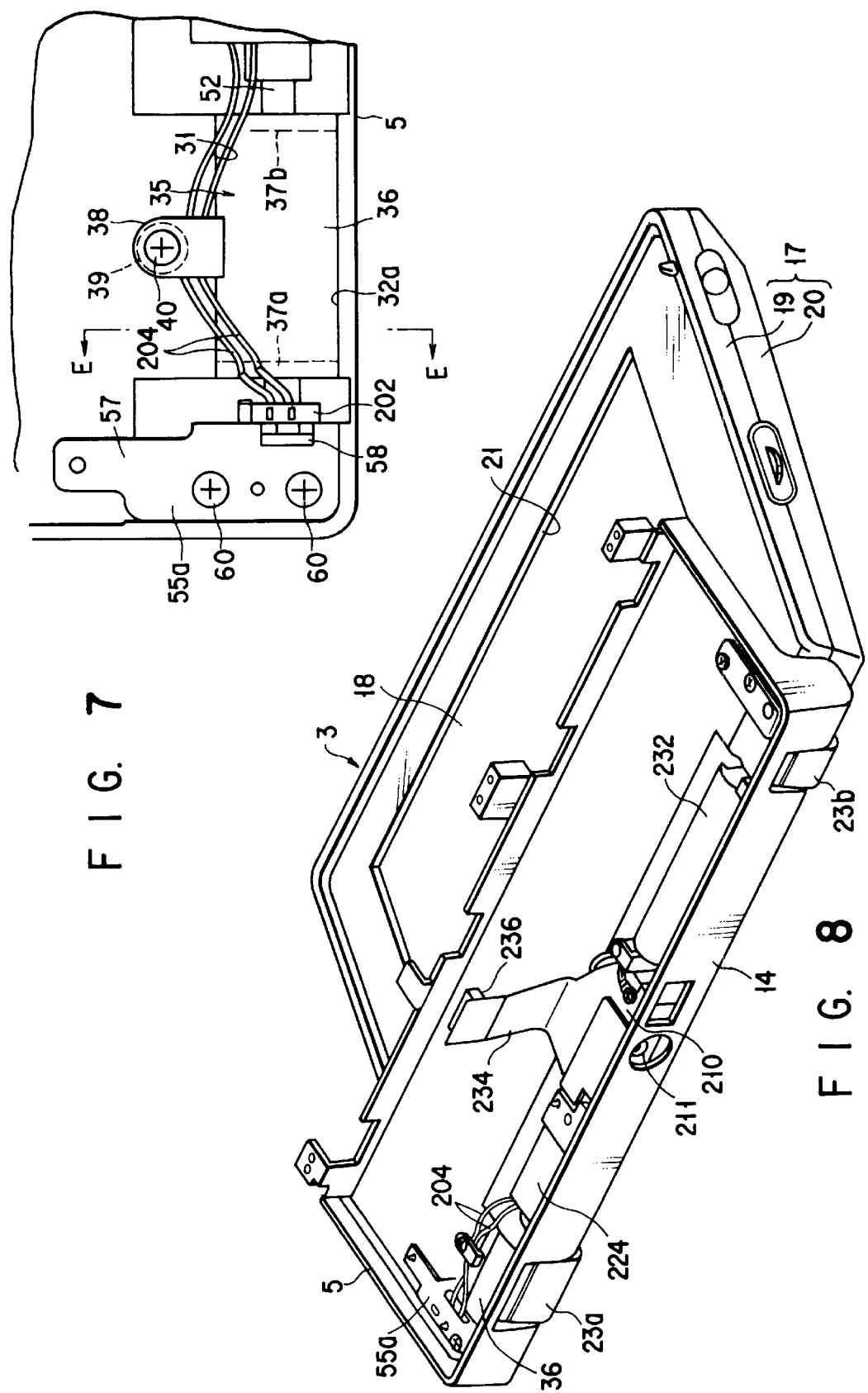

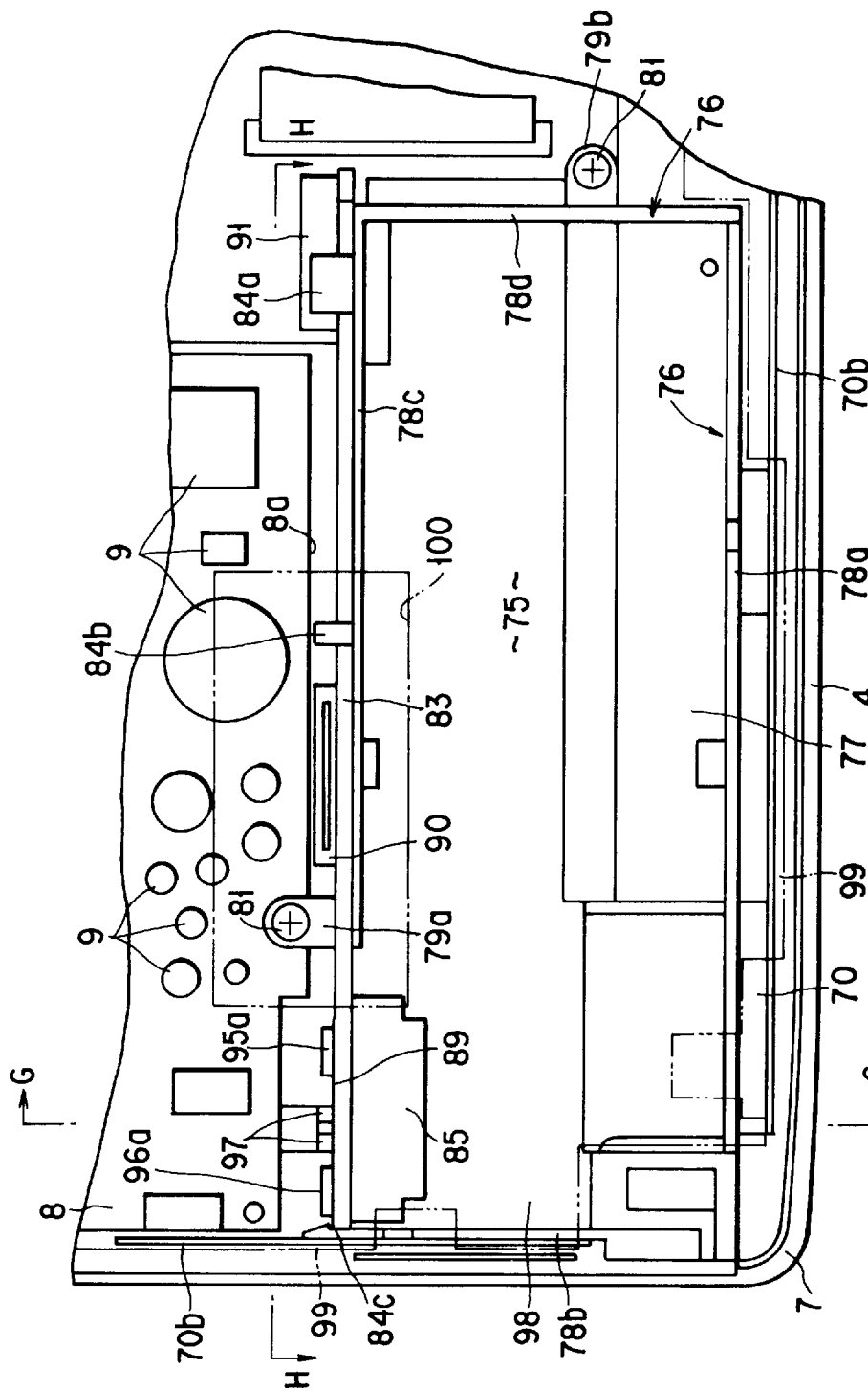
F I G. 10

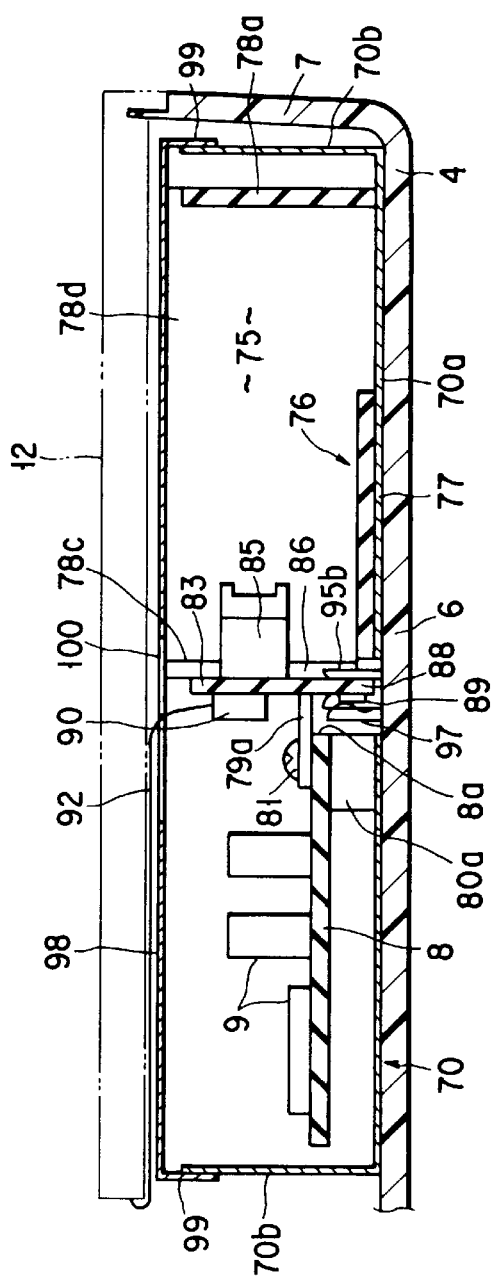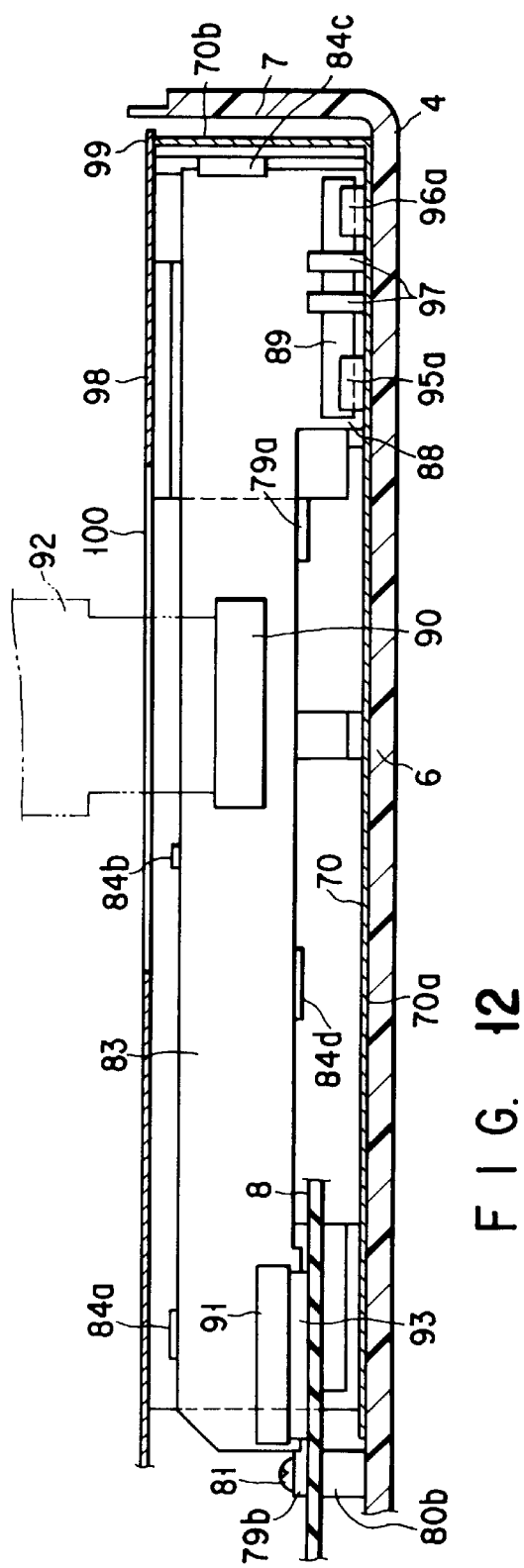
F I G. 11
F I G. 12

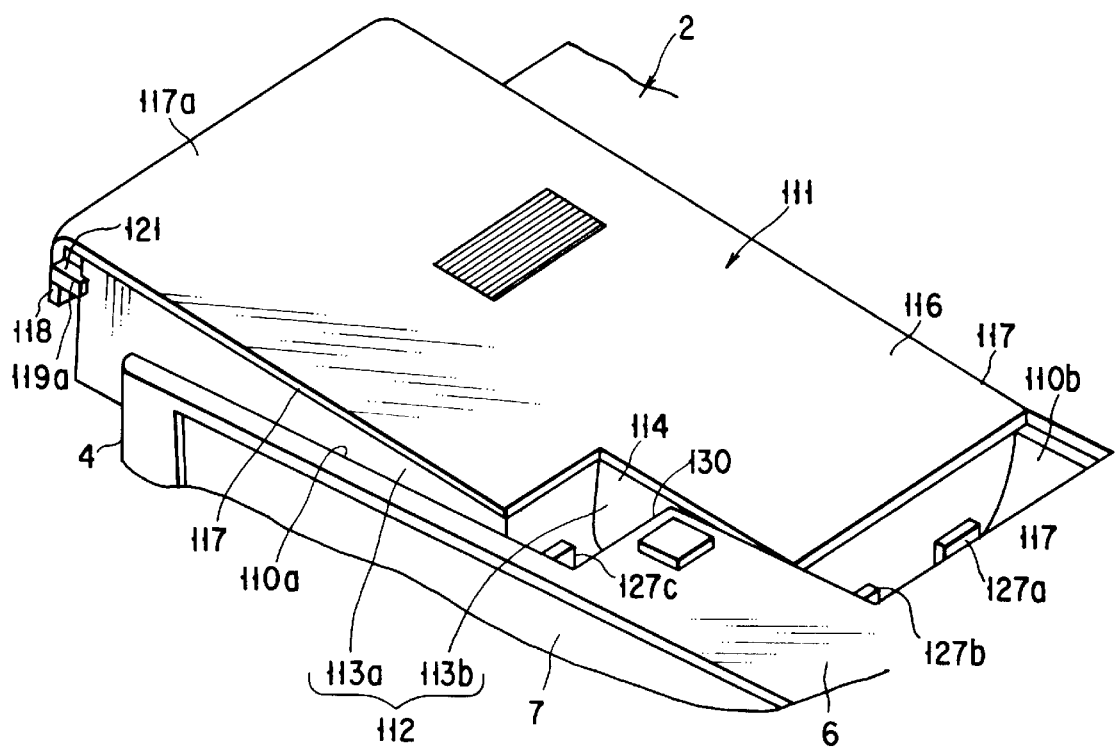
F I G. 15
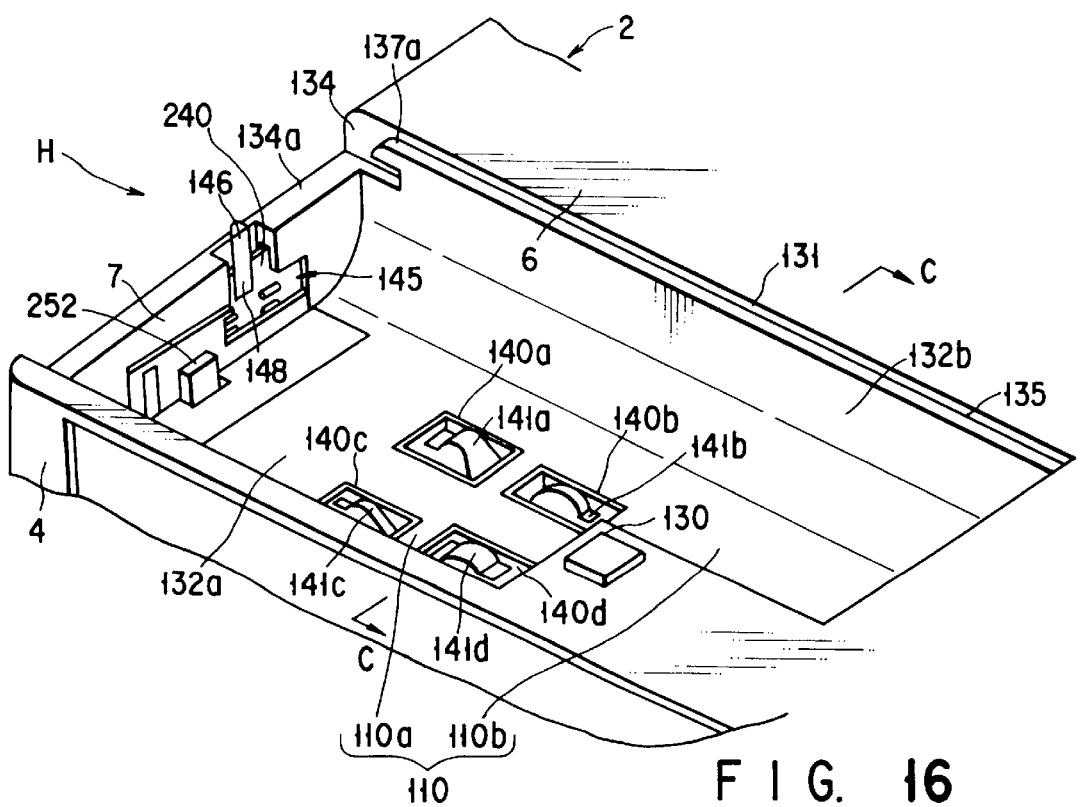
F I G. 16

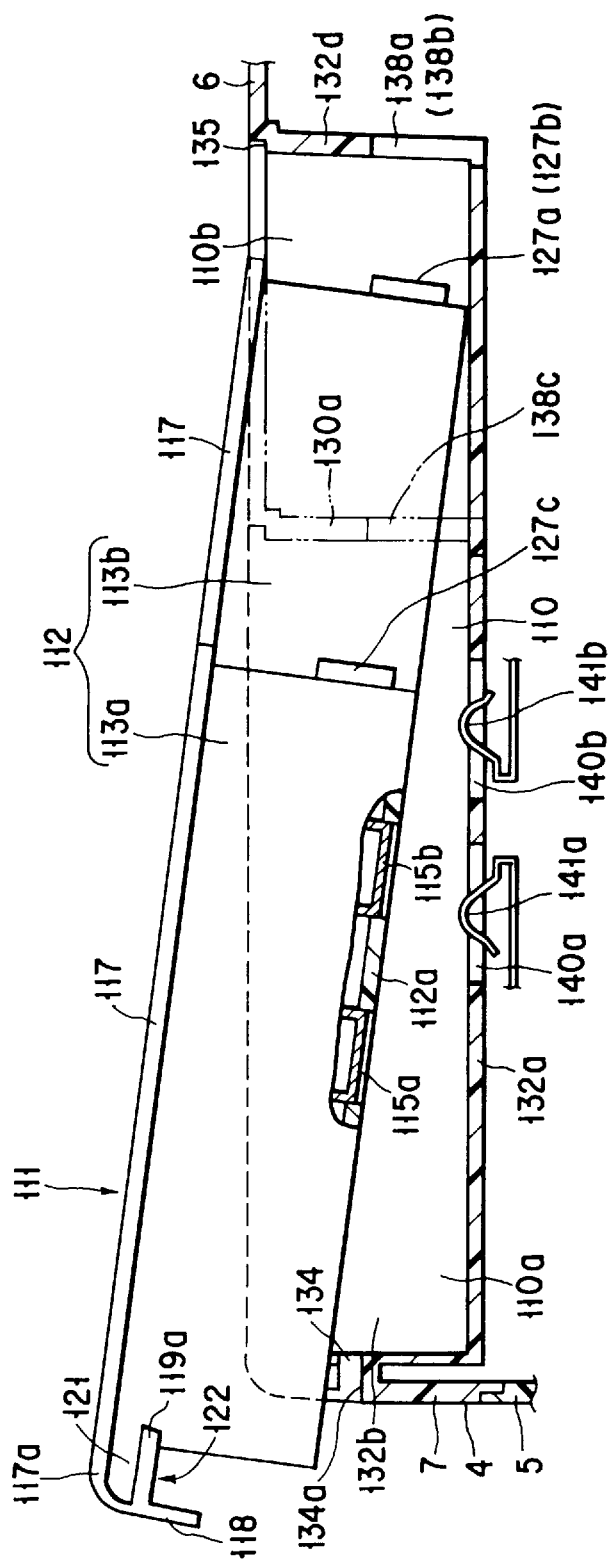
F I G. 17

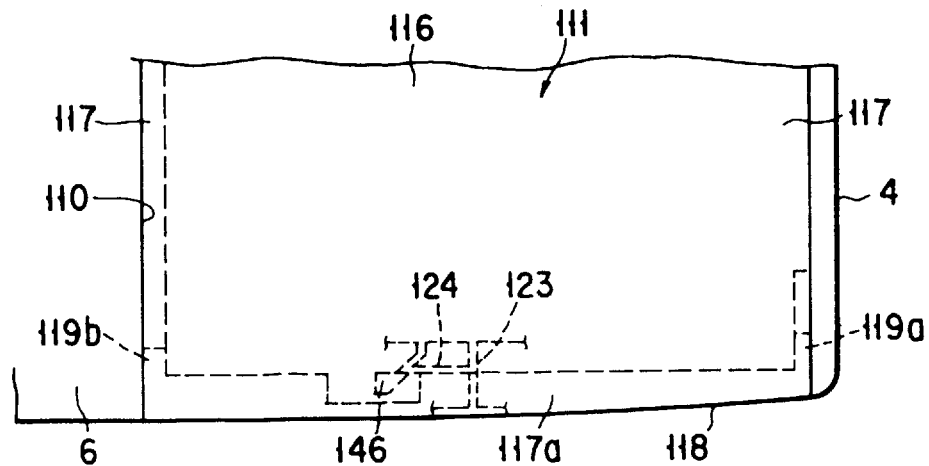
F I G. 18
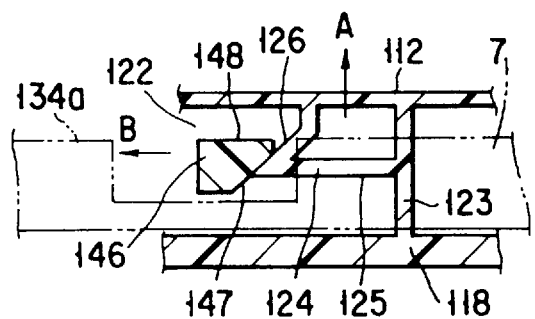
F I G. 19
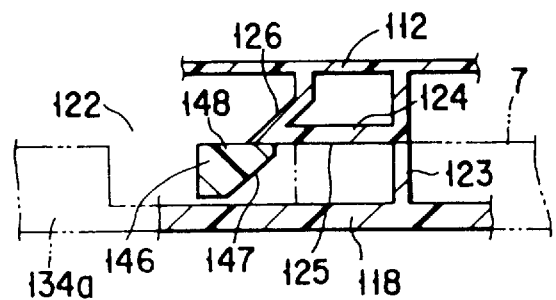
F I G. 20

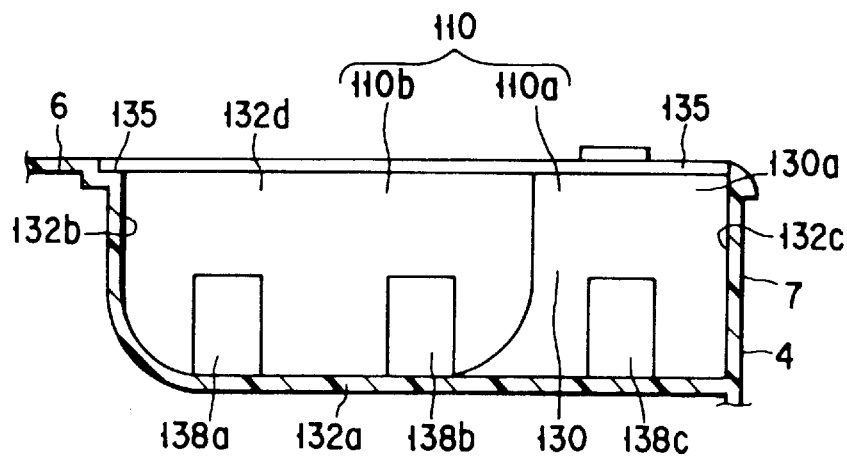
F I G. 21
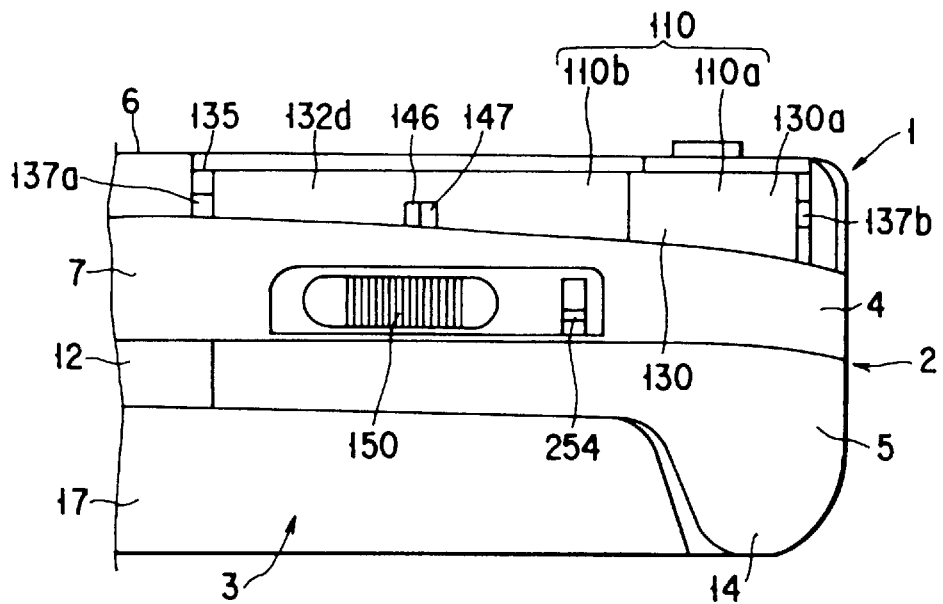
F I G. 22

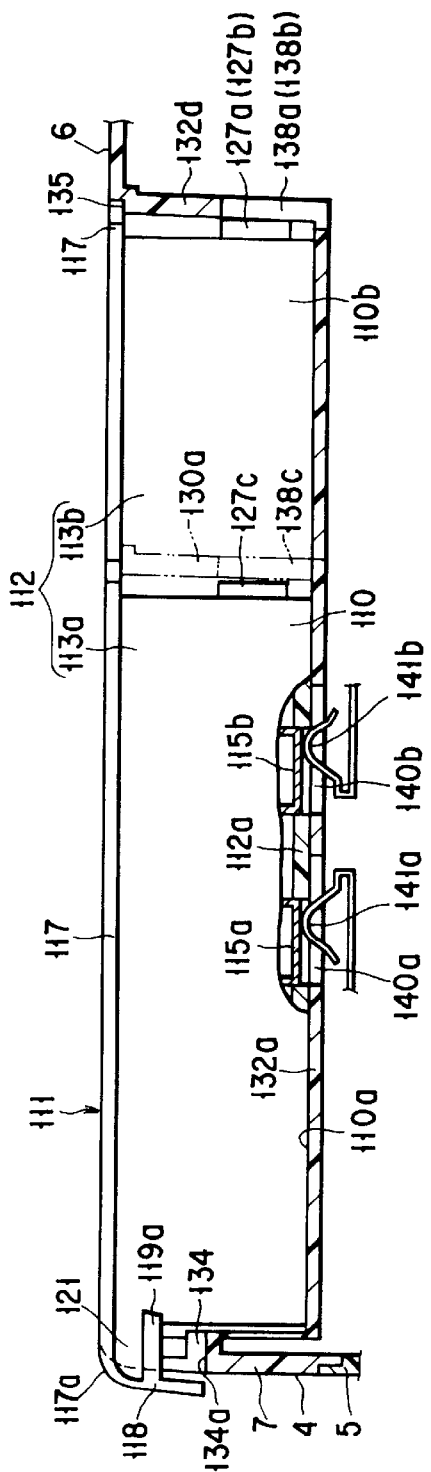
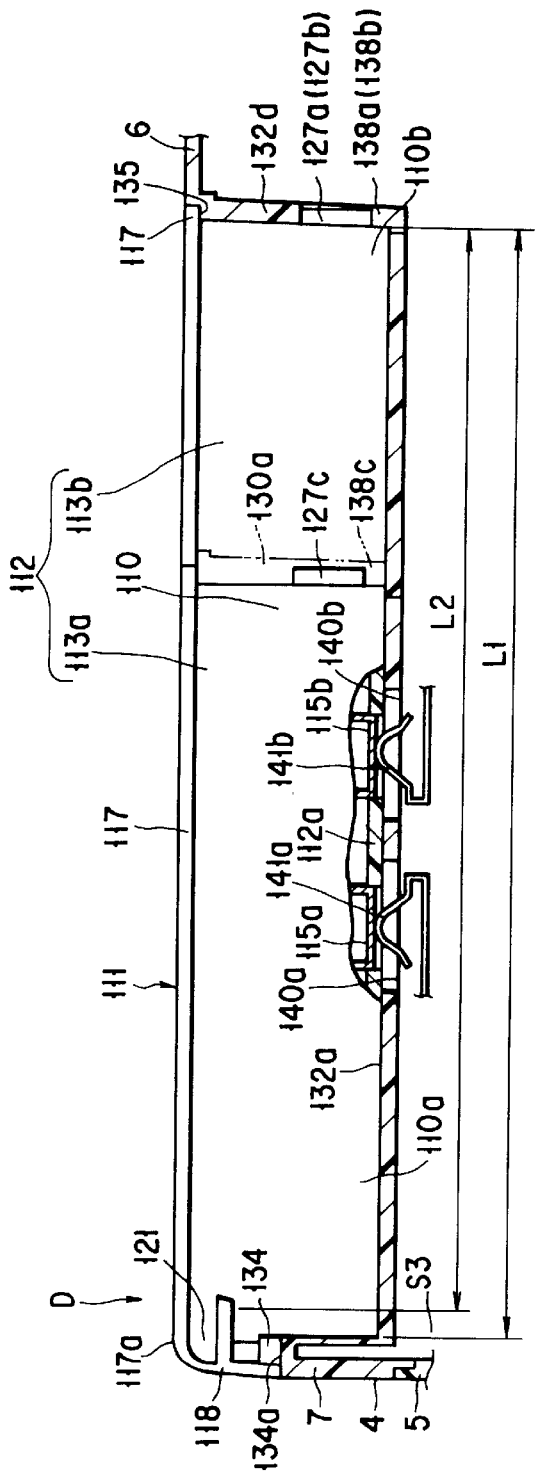
FIG. 23
FIG. 24

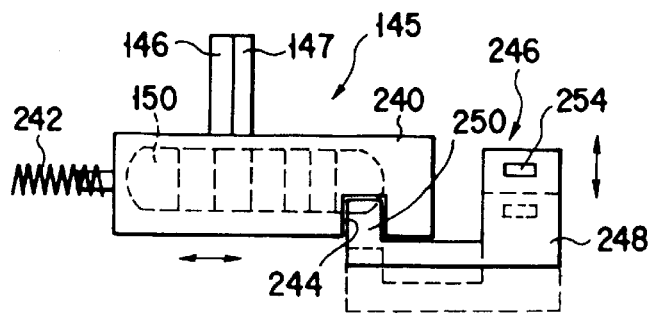
F I G. 25
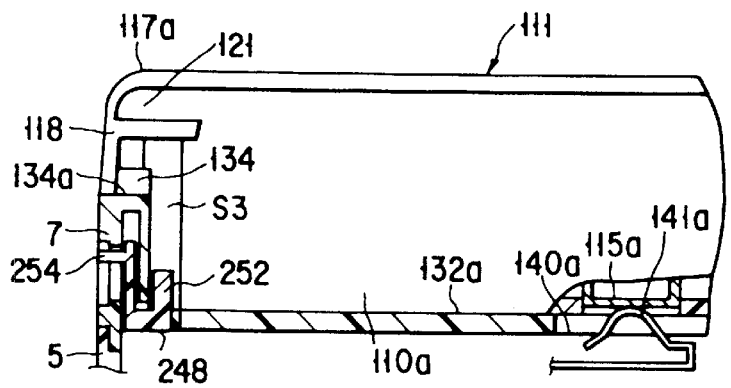
F I G. 26
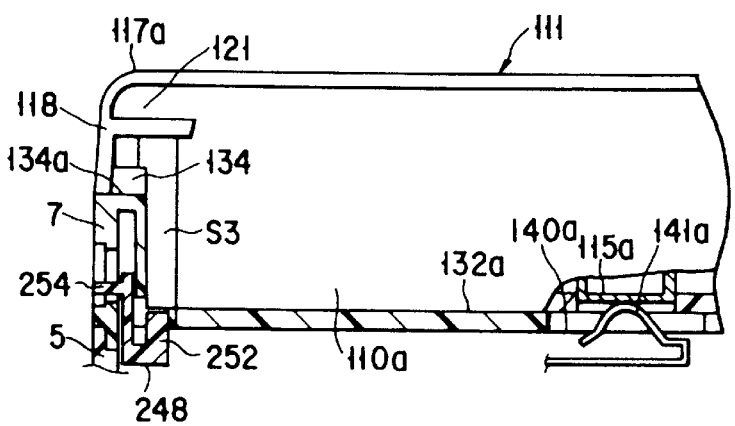
F I G. 27

COMPACT ELECTRONIC APPARATUS HAVING BATTERY PACK DETACHABLY RETAINED BY FOUR ENGAGING PORTIONS AND LATCH MEMBER

This continuation of application Ser. No. 08/084,808 filed on Jun. 29, 1993, now abandoned.

BACKGROUND OF THE INVENTION

1. Field of the Invention

The present invention relates to a compact electronic apparatus such as a book-type personal computer or word processor, and, more particularly, to a structure which allows a battery pack or a unit pack of a single module, such as a hard disk drive, to be detachably fitted into a base unit of a compact electronic apparatus.

2. Description of the Related Art

Portable compact electronic apparatuses such as laptop or book-type personal computers are very popular today because they are easy to carry around and can be used in places where no commercially-available power is available.

This type of compact electronic apparatus is equipped with a battery pack which serves as a driving power supply. The battery pack is a unit of a single module, and is fitted into the base unit which supports a keyboard and a display unit. As the battery pack needs to be detached from the base unit to be recharged or to be replaced with a new one, a conventional known compact electronic apparatus has an attachment recess provided on the bottom of the base unit to thereby allow the battery pack to be detachably fitted into this attachment recess.

This battery pack is so designed that when fitted in the attachment recess, its one surface becomes flush with the bottom of the base unit or this battery pack itself constitutes a part of the bottom of the base unit. Properly fitting this battery pack in the attachment recess will make mechanical and electrical couplings to the base unit simultaneously.

According to the conventional compact electronic apparatus, the battery pack is mechanically held in the attachment recess only by its engagement with a detach-preventing projection, which is provided at one end portion of the attachment recess to engage with the battery pack.

The battery pack constitutes a part of the bottom of the base unit as mentioned above and is supported on the top of a desk or the like in the normal usage. Even if the portion of the engagement between that projection and the battery pack is located closer to one end of the battery pack, therefore, no destructive force would be normally applied to this engaging portion.

When this electronic apparatus is lifted to be carried around or for some other reasons, most of the weight of the battery pack will concentrate on the engaging portion. Particularly, as the battery pack is heavy for its size, the load applied to the engaging portion is increased accordingly. The engaging portion may therefore be deformed, thus making the installed state of the battery pack unstable.

To prevent the deformation of the engaging portion, the aforementioned projection should be enlarged to fully withstand the weight of the battery pack, thus ensuring firmer coupling to the battery pack. This solution however results in inevitable enlargement of the engaging portion including the projection, thus restricting the reduction of the size of the base unit.

SUMMARY OF THE INVENTION

It is therefore an object of the present invention to provide a compact electronic apparatus, which can surely hold a pack of a unit in its attachment recess when the base unit is lifted, and does not require extra space inside the attachment recess even though the pack is slid in the attachment recess for its attachment and detachment, thus contributing to making the base unit more compact.

To achieve the foregoing and other objects and in accordance with the purpose of the present invention, a compact electronic apparatus of the present invention comprises a base unit having a bottom wall and a side wall extending from the bottom wall and accommodating electronic components, the base unit having an attachment recess having a bottom opening portion formed in the bottom wall and a side opening portion formed in the side wall to communicate with the bottom opening portion, and a plurality of partitions for defining the attachment recess, the partitions including a first partition adjacent to and facing the side wall and a second partition facing the first partition at a first distance therebetween; a pack unit adapted to be detachably fitted in the attachment recess and having a first side wall facing the first partition, a second side wall facing the first side wall at a second distance therebetween shorter than the first distance, and an outer wall for constituting a part of the bottom wall when the pack unit is fitted in the attachment recess, the pack unit being movable in the attachment recess between a detaching position and a securing position spaced apart from the detaching position by a predetermined distance nearly equal to a difference between the first and second distances; and holding means for holding the pack unit in the attachment recess, the holding means including a first engaging portion provided adjacent to said side opening portion in the attachment recess, a second engaging portion provided at the second partition, third and fourth engaging portions provided on the pack unit, for engagement with the first and second engaging portions respectively when the pack unit is moved to the securing position from the detaching position in the attachment recess, and securing means for securing the pack unit in the securing position.

With the above structure, to fit the pack unit in the attachment recess, the pack unit is inserted in a tilted state in the attachment recess from the bottom opening portion first, and then the pack unit is twisted at the fore inserting end as a fulcrum to be placed into the attachment recess. This twisting action causes the pack unit to be fitted in parallel to the bottom of the base unit in the attachment recess to come to the detaching position. As the attachment recess has the side opening portion formed in one side wall of the base unit to communicate with the bottom opening portion, the rear inserting end of the pack unit protrudes sideward of the base unit through the side opening portion.

Sliding the pack unit in this situation toward the far end portion of the attachment recess by the predetermined distance causes the third engaging portion of the pack unit to be engaged with the second engaging portion at the far end portion of the attachment recess and causes the fourth engaging portion of the pack unit to be engaged with the first engaging portion at the side opening portion. This engagement permits the pack unit to be held, with both ends supported, in the attachment recess and to stably rest therein.

Further, as the attachment recess is also continuously open to the side wall of the base unit, the end portion of the pack unit which is protruding from the side opening portion should simply be pushed to slide the pack unit in the attachment recess. It is therefore unnecessary to put a finger inside the attachment recess to slide the pack unit, thus eliminating the need for the extra space which is otherwise required.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1 through 27 illustrate a personal computer according to one embodiment of the present invention, in which:

FIG. 1 is a perspective view of the personal computer with a display unit open;

FIG. 2 is a perspective view of the personal computer with a battery pack fitted in a base unit;

FIG. 3 is an exploded perspective view illustrating a coupling portion between the display unit and the base unit;

FIG. 4 is a perspective view of a leg attaching portion of the base unit;

FIG. 5 is a cross section taken along the line V—V in FIG. 7;

FIG. 6 is a cross-sectional view of the coupling portion between the display unit and the base unit;

FIG. 7 is a view from the direction of the line F in FIG. 6;

FIG. 8 is a perspective view showing the bottom of an upper case and the display unit;

FIG. 9 is an exploded perspective view illustrating components attached to the upper case;

FIG. 10 is a plan view showing a modem case attached to a lower case;

FIG. 11 is a cross sectional view taken along the line X1—X1 in FIG. 10;

FIG. 12 is a cross sectional view taken along the line X11—X11 in FIG. 10;

FIG. 13 is an exploded perspective view illustrating that portion where the modem case and an interconnection board are coupled;

FIG. 14 is a perspective view showing the positional relationship between the interconnection board and a printed circuit board;

FIG. 15 is a perspective view illustrating the battery pack inserted, tilted, into an attachment recess of the base unit;

FIG. 16 is a perspective view of the attachment recess of the base unit;

FIG. 17 is a cross-sectional view illustrating the battery pack inserted, tilted, into the attachment recess of the base unit;

FIG. 18 is a plan view of the battery pack as viewed from the direction of the line D in FIG. 23;

FIG. 19 is a cross sectional view illustrating a latch piece disengaged from an engaging projection;

FIG. 20 is a cross sectional view illustrating the latch piece engaged with the engaging projection;

FIG. 21 is a cross-sectional view of the attachment recess of the base unit taken along the line XX1—XX1 in FIG. 16;

FIG. 22 is a side view of the base unit as viewed from the direction of the line H in FIG. 16;

FIG. 23 is a cross sectional view showing the battery pack resting in the attachment recess of the base unit;

FIG. 24 is a cross sectional view showing the battery pack completely fitted in the attachment recess of the base unit;

FIG. 25 is a side view schematically illustrating a holding mechanism and a lock mechanism;

FIG. 26 is a cross sectional view illustrating a lock member shifted to a lock position; and FIG. 27 is a cross sectional view illustrating the lock member shifted to an unlock position.

DETAILED DESCRIPTION OF THE PREFERRED EMBODIMENTS

Figure 2:
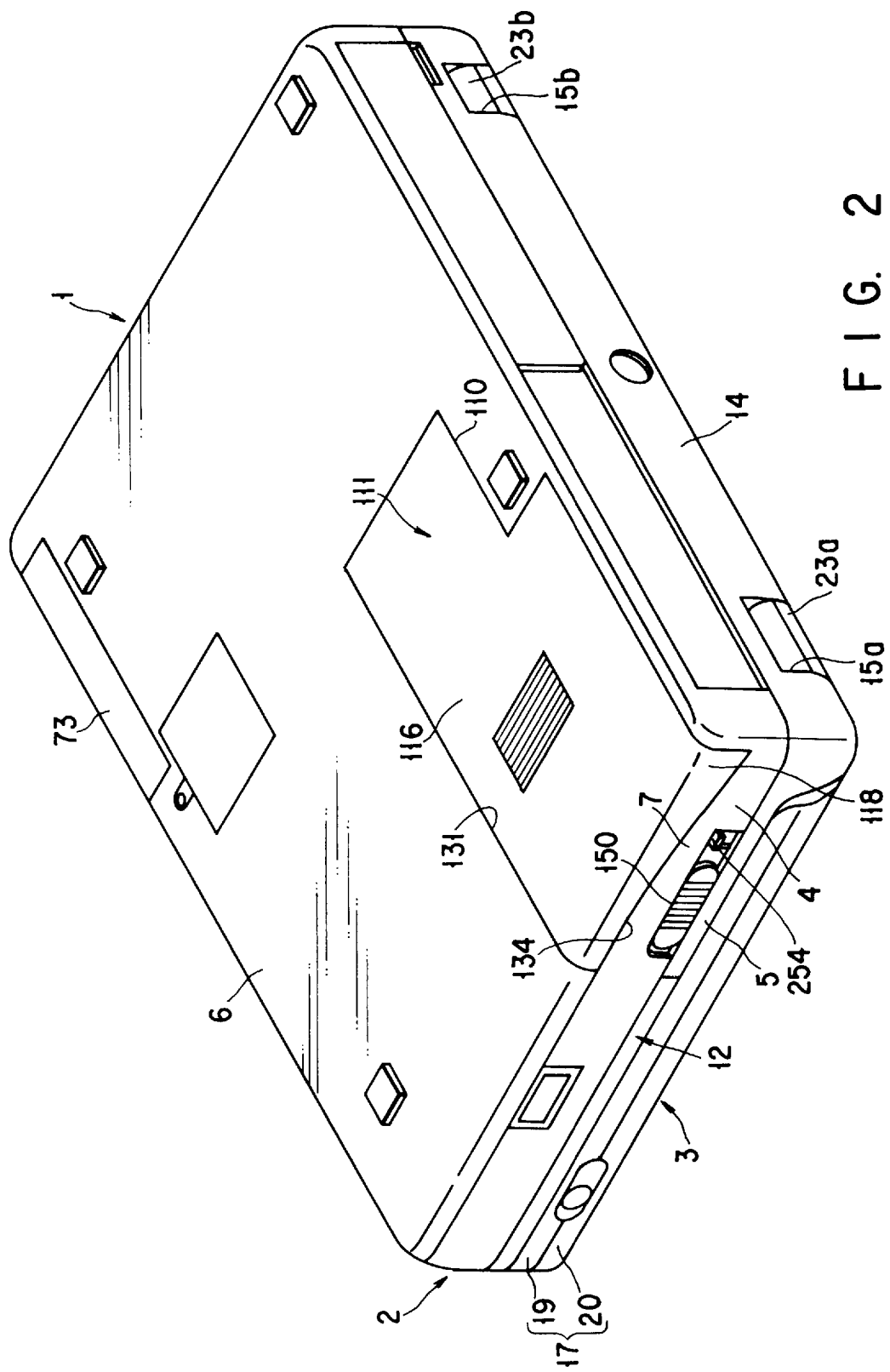

One preferred embodiment of the present invention will now be described referring to the accompanying drawings.

FIG. 1 illustrates a book-type personal computer 1 of A4 size according to one embodiment of the present invention. This computer 1 has a base unit 2 having a shape of a flat rectangular pack, and a display unit 3 of a flat panel type.

The base unit 2 includes a lower case 4 made of a synthetic resin and having an open top, and an upper case 5 that is placed over the lower case 4. As shown in FIG. 10, the lower case 4 has a flat bottom wall 6 which forms the bottom of the base unit 2 and a side wall 7 provided upright at the periphery of the bottom wall 6. Horizontally supported on the bottom wall 6 of the lower case 4 is a printed circuit board 8, as shown in FIG. 20, on which many circuit components 9 that constitute a power supply circuit portion are mounted.

As shown in FIG. 1, the upper case 5 covers the rear half of the lower case 4. This upper case 5 has a top wall 10 which is the top of the base unit 2, and a side wall 11 extending downward from the periphery of the top wall 10, both walls 10 and 11 being formed integral with each other. The side wall 11 of the upper case 5 continuously extends to be flush with the side wall 7 of the lower case 4, and those side walls 7 and 11 constitute the front, rear, and right and left sides of the base unit 2.

A keyboard unit 12 is detachably attached to the front half of the lower case 4. The keyboard unit 12 comes to be nearly flush with the front and sides of the base unit 2 and the top of the upper case 5. A protruding portion 14 extending above the top wall 10 is formed at the rear end portion of the upper case 5. The protruding portion 14 extends all across the upper case 5. A first leg attaching portion 15a and a second leg attaching portion 15b are formed as recessed portions on left and right sides of the protruding portion 14. The is protruding portion 14 between the first and second leg attaching portions 15a and 15b has several openings 16a formed therein side by side, with LEDs 16 placed in the openings 16a to indicate the operational statuses of the computer 1.

The display unit 3 has a thin box-shaped housing 17 of a synthetic resin, and a liquid crystal display 18 accommodated in the housing 17. The housing 17 has a front panel 19 and a rear panel 20 that covers the back of the front panel 19. The liquid crystal display 18 is held between both panels 19 and 20. Formed in the front panel 19 is a window 21 to expose the liquid crystal display 18.

Figure 3:
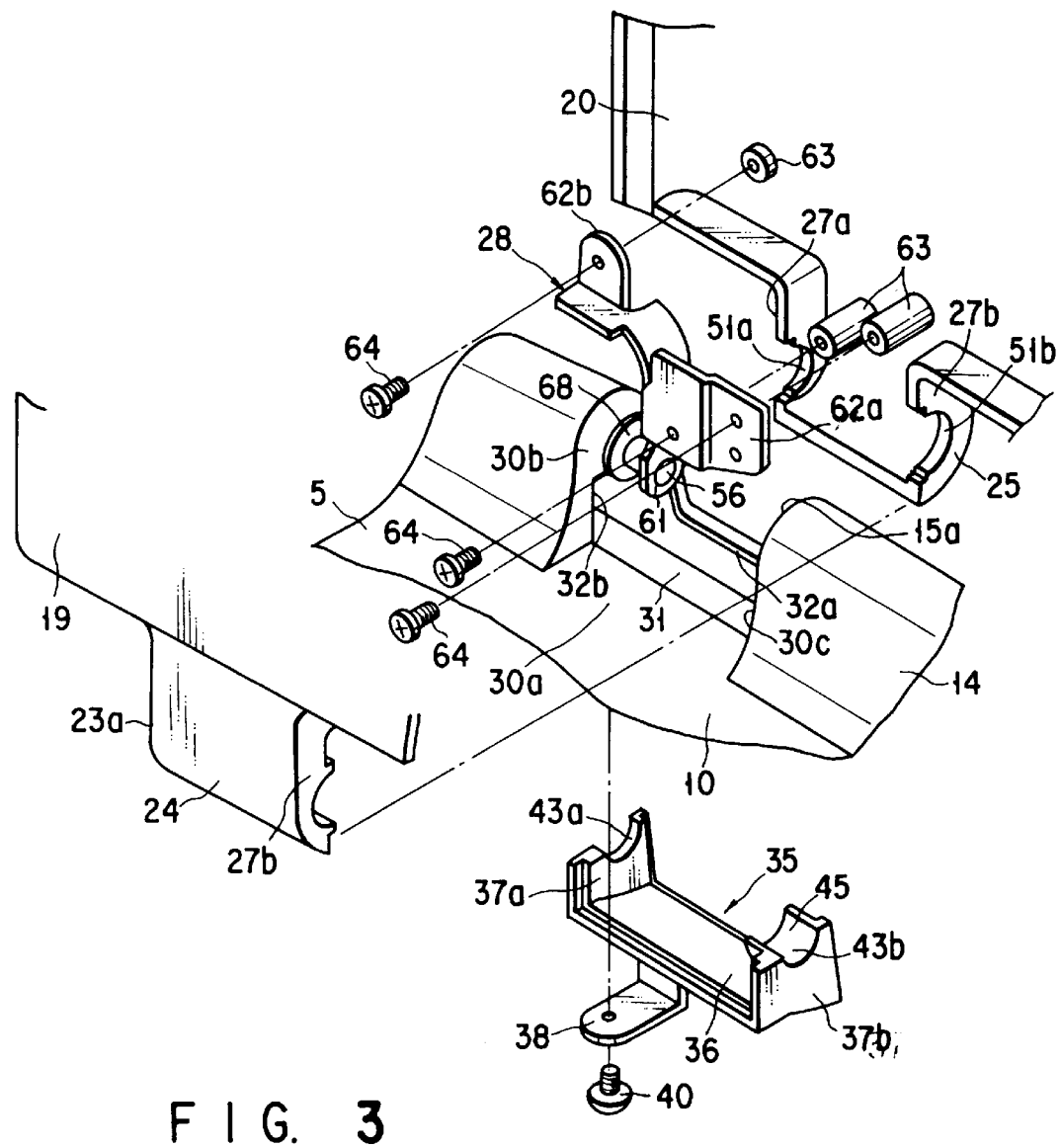
Figure 5:
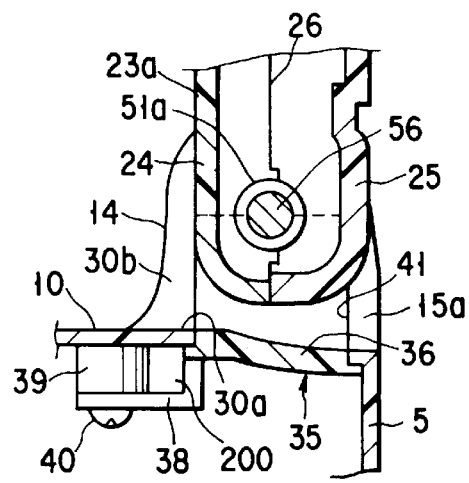

A first support leg 23a and a second support leg 23b are integrally and protrusively provided at the left and right side portions of the housing 17. The support legs 23a and 23b each have a front leg 24 extending from the front panel 19 and a rear leg 25 extending from the rear panel 20, as shown in FIG. 3, which shows just the first support leg 23a. The legs 24 and 25 butt each other in the thickness direction of the housing 17. Therefore, each support leg 23a or 23b is hollow, with a boundary 26 present at the butted portion of the legs 24 and 25, as shown in FIG. 5. This boundary 26 is exposed from the left and right sides 27a and 27b of the support leg 23a.

The support legs 23a and 23b are respectively fitted in the leg attaching portions 15a and 15b, and are rotatably coupled to the upper case 5 via associated hinges 28. Accordingly, the display unit 3 is rotatable over the region from a close position where the display unit 3 covers the keyboard unit 12 as shown in FIG. 2, and an open position where a user can use the keyboard unit 12 while viewing the liquid crystal display 18 as shown in FIG. 1. With the display unit 3 set to the close position, the housing 17 of the display unit 3 comes flush with the side surfaces and front surface of the base unit 2 and the protruding portion 14, so that the computer 1 will have a flat box shape which is easy to carry around.

Figure 4:
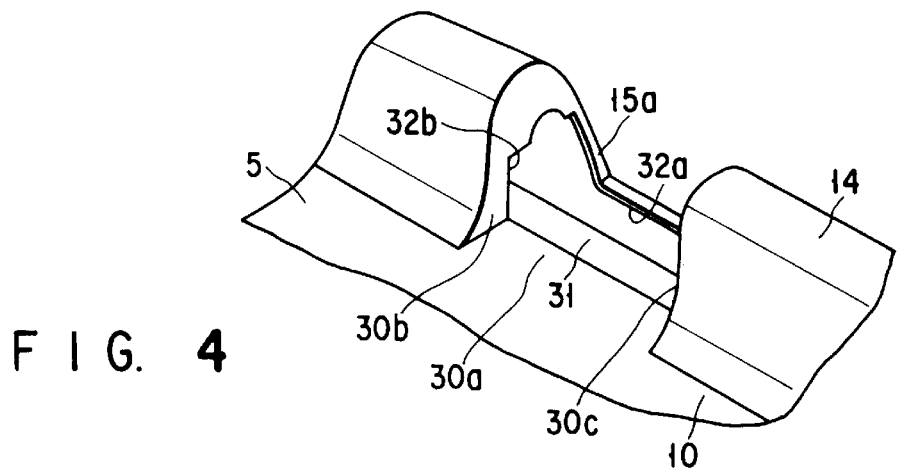

The first leg attaching portion 15a where the first support leg 23a is to be inserted has a bottom 30a and left and right sides 30b and 30c extending from the bottom 30a as shown in FIGS. 3 through 5. The bottom 30a is flush with the top of the base unit 2.

Figure 6:
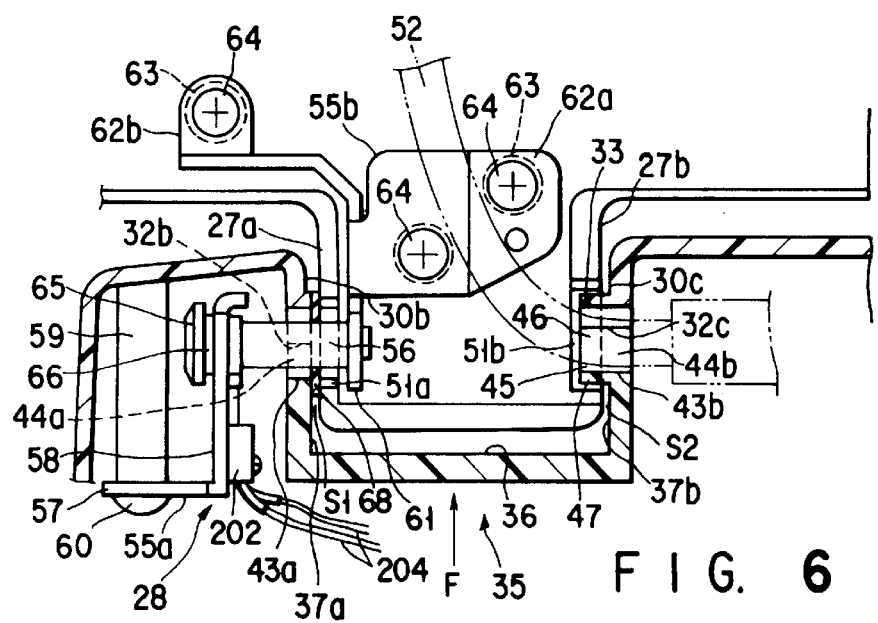
Figure 9:
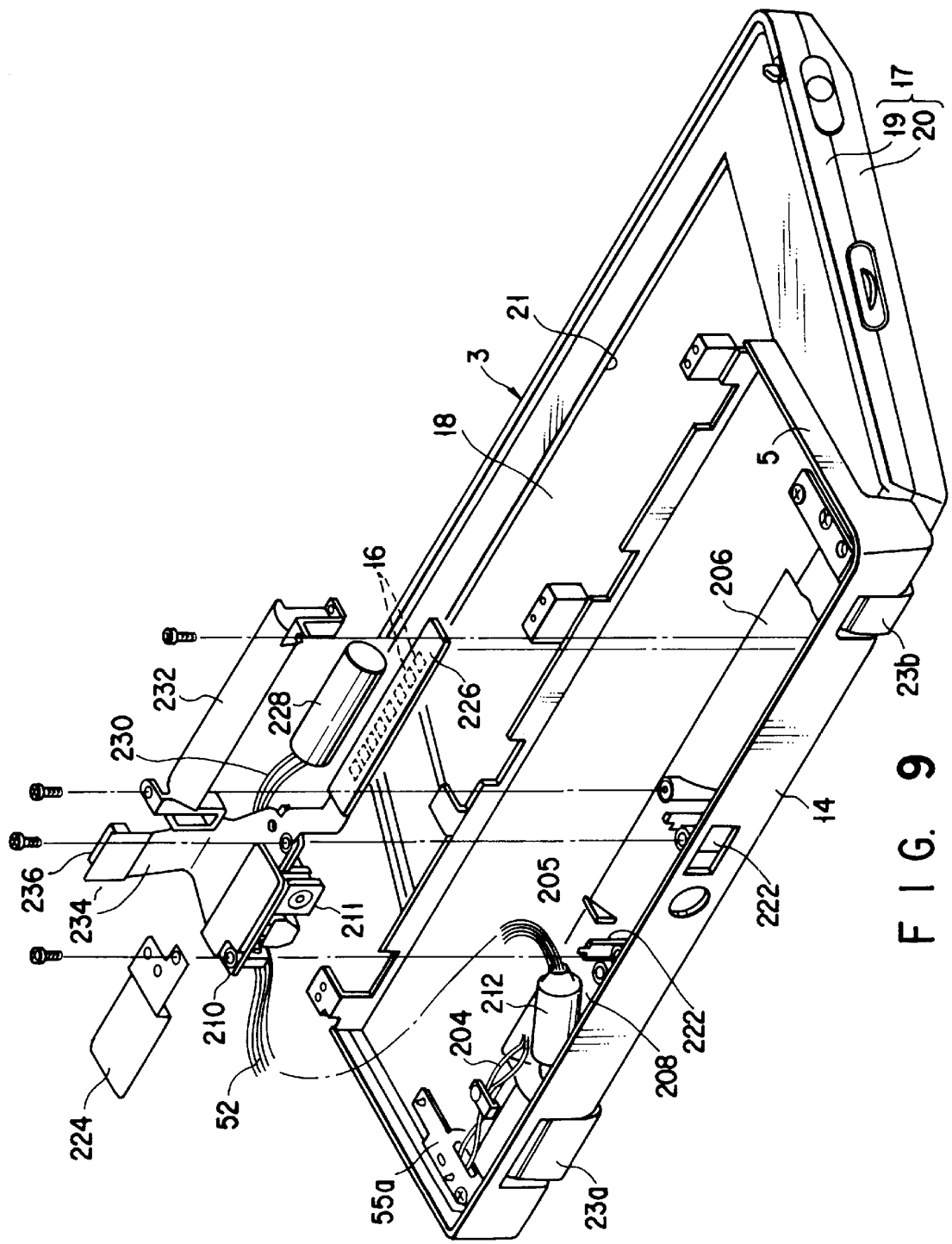

Formed in the first leg attaching portion 15a is an opening portion 31 which is open to the base unit 2 the base unit 2. The opening portion 31 includes a bottom opening portion 32a formed in the bottom 30a, and side opening portions 32b and 32c which are respectively formed in the left and right sides 30b and 30c, the bottom opening portion 32a communicating with the side opening portions 32b and 32c. The upper periphery of each of the side opening portions 32b and 32c is formed in an arc shape. As shown in FIG. 6, a semi-cylindrical guide portion 33 is formed at the upper periphery of the opening of the left opening portion 32c, and protrudes inside the first leg attaching portion 15a.

As shown in FIGS. 3 and 6, the upper case 5 of the base unit 2 is attached with a cover 35 which covers the opening portion 31 from inside the upper case 5. The cover 35 has a bottom plate 36 for covering the bottom opening portion 32a and side plates 37a and 37b for covering the respective side opening portions 32b and 32c, those plates 36, 37a and 37b being formed integrally. The bottom plate 36 has a tongue 38, which is put over a boss portion 39 at the inner wall of the upper case 5. When the tongue 38 is secured to the boss portion 39 by a screw 40, the cover 35 is supported on the upper case 5 while covering the opening portion 31. Space 200 is formed between the tongue 38 and the boss portion 39, and a cable extending from an open/close sensor of the display unit 3, which will be described later, is inserted into this space 200.

As shown in FIG. 5, a butting line 41 of the opening edge portion of the opening portion 31 and the cover 35 extends from the bottom 30a of the first leg attaching portion 15a to the sides 30b and 30c, and faces the boundary 26 of the support leg 23a inside the first leg attaching portion 15a.

As shown in FIG. 3, arcuate cutaway receiving portions 43a and 43b are formed in the upper edge portions of the side plates 37a and 37b. The receiving portions 43a and 43b face the upper edge portions of the openings of the side opening portions 32a and 32b, and constitute, together with those side opening portions 32a and 32b, circular through holes 44a and 44b, which are formed in the sides 30b and 30c of the first leg attaching portion 15a and are open to the interior of the upper case 5.

As shown in FIG. 6, a semi-cylindrical guide portion 45 is protrusively provided at the left receiving portion 43b.

The guide portion 45 butts the guide portion 33 of the side opening portion 32b, forming a hollow shaft 47 having a guide passage 46, in the left side 30c of the first leg attaching portion 15a. The guide passage 46 communicates with the through hole 44b through which it also communicates with the interior of the base unit 2.

The sides 30b and 30c of the first leg attaching portion 15a respectively face the sides 27a and 27b of the first support leg 23a, and through holes 51a and 51b are formed in those sides 27a and 27b, respectively. The through holes 51a and 51b are open over the butting portion of the front leg 24 and rear leg 25 of the support leg 23a. The left through hole 51a matches with the through hole 44a, while the right through hole 51b is rotatably fitted over the hollow shaft 47. This fitting of the through hole 51b causes the guide passage 46 in the hollow shaft 47 to communicate with the interior of the first support leg 23a.

A cable 52 extending from the display unit 3 to the base unit 2 runs through this guide passage 46. One end of the cable 52 is guided inside the first support leg 23a via the guide passage 46, and is then led inside the housing 17 to be electrically connected to the liquid crystal display 18. The other end of the cable 52 is guided inside the base unit 2 via the guide passage 46.

As shown in FIGS. 3 and 6, each of the hinges 28 for coupling the display unit 3 to the base unit 2 includes a pair of brackets 55a and 55b and a hinge shaft 56 provided between the brackets 55a and 55b. The bracket 55a is secured inside the upper case 5, and has a horizontal base 57 and an upright portion 58 standing upright from one edge portion of the base 57 and facing the side 30b of the first leg attaching portion 15a in the upper case 5. The base 57 is secured to the boss portion 59 at the inner wall of the upper case 5 by a screw 60.

The other bracket 55b is retained in the first support leg 23a. This bracket 55b has a shaft support 61 facing the side 27a inside the support leg 23a and a plurality of tongues 62a and 62b extending to the shaft support 61. The tongues 62a and 62b are secured to boss portions 63 of the rear leg 25 of the first support leg 23a and the inner wall of the rear panel 20 by screws 64.

The hinge shaft 56 is placed between the upright portion 58 and the shaft support 61. This hinge shaft 56 is coaxial with the hollow shaft 47 and extends through the left through holes 44a and 51a. The end of the hinge shaft 56 led into the support leg 23a is caulked to the shaft support 61 of the bracket 55b, so that the hinge shaft 56 itself rotates together with the other bracket 55b. The end of the hinge shaft 56 led into the upper case 5 is supported on the upright portion 58 to be rotatable in the rotational direction of the shaft. A ring-shaped spring presser foot 65, which rotates together with the hinge shaft 56, is caulked to this supported end. The spring presser foot 65 faces the outer surface of the upright portion 58 with a slit clearance therebetween, with a wave washer 66 located and compressed between the presser foot 65 and the upright portion 58. The washer 66 serves to give a frictional resistance between the hinge shaft 56 and the bracket 55a. This frictional force restricts the free rotation of the hinge shaft 56 and permits the display unit 3 to be held at a desired open position.

As shown in FIGS. 3 and 6, a washer 68 of a synthetic resin, such as vinyl chloride is fitted around the hinge shaft 56. The washer 68 is located between the side 27a of the first support leg 23a and the side 30b of the first leg attaching portion 15a to keep a clearance S1 between both sides 27a and 30b constant. The washer 68 is slidably in contact with the sides 27a and 30b to prevent the boundary 26 on the side 27a from interfering with the butting line 41 on the side 30b.

As the clearance Si between the sides 27a and 30b is defined, a clearance S2 is also secured between the right sides 27b and 30a to prevent the sliding contact of the side 27b with the side 30a.

As the coupling portion of the second leg attaching portion 15b and the second support leg 23b has the same structure as the coupling portion of the first leg attaching portion 15a and the first support leg 23a except that there is no guide passage 46 or no hollow shaft 47 in the second support leg 23b, its detailed description will be omitted.

In the hinge 28 having the above-described structure, the washer 68 of a synthetic resin, located between the side 27a of the first support leg 23a and the side 30b of the first leg attaching portion 15a, is fitted around the hinge shaft 56 to keep the clearance S1 between both sides 27a and 30b constant. Therefore, even if the boundary 26 of the first support leg 23a shifts from the butting line 41 of the first leg attaching portion 15a, creating steps on the facing sides 27a and 30b, the steps on the sides 27a and 30b would not interfere with each other when the display unit 3 is rotated.

With the above-described structure, since the first leg attaching portion 15a and first support leg 23a have separable structures, if some deviation occurs at the butting portion of the leg attaching portion 15a and the cover 35 and the butting portion of the front leg 24 and rear leg 25 of the support leg 23a due to the dimensional tolerance or the like, steps may be formed at the butting portions. Then, the butting portions are located on the facing sides 27a and 30b of the leg attaching portion 15a and support leg 23a. When the display unit 3 is rotated, therefore, the steps contact with each other, producing uncomfortable contact sounds or inhibiting the smooth rotation of the display unit 3.

As a solution to this problem, the separation of the leg attaching portion 15a and the support leg 23a may be modified to prevent the boundary 26 of the leg attaching portion 15a from interfering with the butting line 41 of the support leg 23a. This design complicates the separation structures of the leg attaching portion 15a and support leg 23a, raising new problems of making the assembling troublesome and increasing the cost.

With the structure of this embodiment, however, the simple provision of the washer 68 around the hinge shaft 56 keeps the clearance S1 between the side 30b of the leg attaching portion 15a and the side 27a of the support leg 23a constant to thereby prevent both sides 27a and 30b from coming too close to each other. Even if some steps are created on the sides 27a and 30b due to the dimensional tolerance or the like, the steps would not interfere with each other when the display unit 3 is rotated. It is therefore possible to prevent the generation of uncomfortable contact sounds or ensure the smooth rotation of the display unit 3.

As shown in FIGS. 6 through 9, an open/close sensor 202 for detecting the opening/closing of the display unit 3 is secured to the upright portion 58 of the bracket 55a. Lead wires 204 of the sensor 202 run through the space 200 defined between the tongue 38 of the cover 35 and the boss portion 39 and extends to nearly the center of the upper case 5. The lead wires 204 are positioned by the tongue 38.

A storing portion is defined on the inner wall side of the upper case 5 by the protruding portion 14. Specifically, the protruding portion 14 defines a board storing portion 205 located at the widthwise center portion of the upper case 5, a battery storing portion 206 and a cable storing portion 208, the last two portions 206 and 208 located on the respective sides of the board storing portion 205. Arranged in the board storing portion 205 is a circuit board 210 mounted with a connector 211 for connecting to a DC power supply and other electronic components. This circuit board 210 is secured by screws to boss portions 222 provided upright on the inner surface of the upper case 5. The lead wires 204 of the open/close sensor 202 are connected to the circuit board 210.

Stored the cable storing portion 208 is a core 212 of the cable 52 running from the display unit 3. The leading end of the cable 52 is connected to the circuit board 210. The core 212 is covered with a shield plate 224, which is fastened together with the circuit board 210 to the boss portions 222 by screws.

An LED board 226 on which LEDs 16 are mounted is retained at the bottom of the battery storing portion 206, the LEDs 16 facing the respective openings 16a (see FIG. 1) formed in the upper case 5. Also stored in the portion 206 is a sub-battery 228 placed on the LED board 226. This sub-battery 228 is connected via cables 230 to the circuit board 210 and is covered with a battery cover 232, which is fastened to the inner surface of the upper case 5 by screws.

A flexible flat cable 234 is electrically connected to the circuit board 210 and is secured thereto. The cable 234 extends to the lower case 4, with a connector 236 attached to the leading end of the cable 234. A part of the cable 234 is electrically connected to the LED board 226, and the connector 236 of the cable 234 is electrically and detachably connected to the printed circuit board 8 disposed in the lower case 4. Various components attached to the upper case 5, such as the is circuit board 210, sub-battery 228, LED board 226 and display unit 3, are all connected via the single flat cable 234 to the printed circuit board 8 in the lower case 4. In other words, the components located on the upper case 5 can be connected to the printed circuit board 8 by simply connecting the single connector 236 to the printed circuit board 8 in the lower case 4, facilitating the connection. The shield plate 224 is connected via a screw (not shown) to the ground line located on the side of the lower case 4.

As shown in FIGS. 11 and 12, most of the inner surface of the lower case 4 is covered with a metal shield plate 70. This shield plate 70 includes a bottom plate 70a for covering the top of the bottom wall 6 of the lower case 4 and a side plate 70b, standing upright from the periphery of the bottom plate 70a, for covering the side wall 7 from inside. Arranged in the lower case 4 covered with this shield plate 70 are a floppy disk drive 71 and a hard disk drive (not shown). Those disk drives are placed on the top of the printed circuit board 8. As shown in FIG. 11, the floppy disk drive 71 is located under the keyboard unit 12, and a slot 72 for a floppy disk is formed through the side wall 7 of the lower case 4.

A cap 73 for closing a card retainer (not shown), which accommodates a memory card or an interface card, is attached to the front of the base unit 2. The card retainer is located under the floppy disk drive 71.

Figure 13:
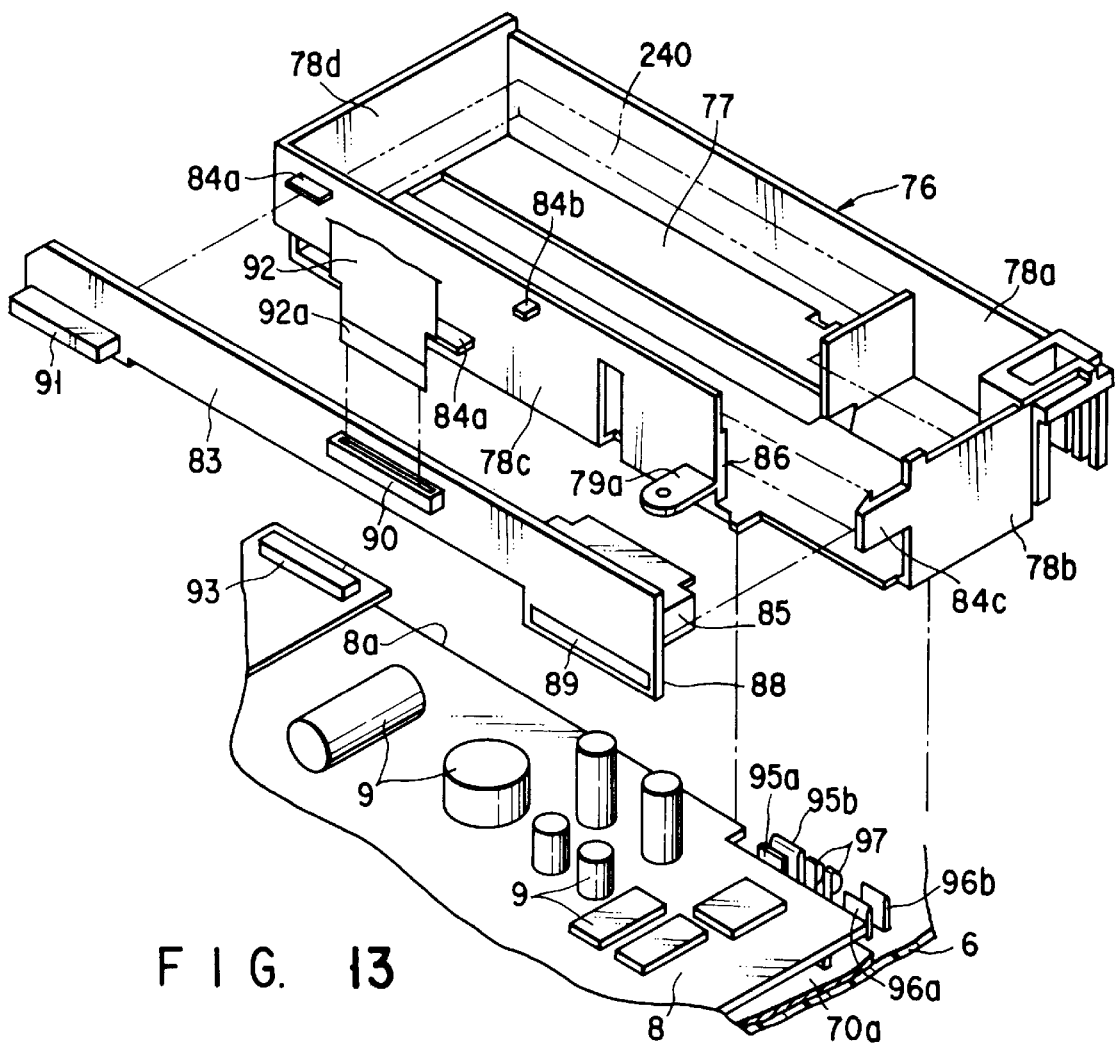

As shown in FIG. 10, expansion space 75 for accommodating an expansion device, such as a modem 240 for communication, is provided on the front half of the lower case 4 that is closed by the keyboard unit 12. The expansion space 75 is defined by a modem case 76 of a synthetic resin. The modem case 76 has a shape of an elongated box with its top open as viewed from the top, and has a bottom plate 77 located on the bottom wall 6 of the lower case 4 and front, back, left and right side plates 78a to 78d standing upright from the periphery of the bottom plate 77, as shown in FIG. 13. The printed circuit board 8 is cut away at the portion where the modem case 76 is to be placed, so that the modem case 76 is placed in the region surrounded by the cut portion 8a of the printed circuit board 8, the side wall 7 of the lower case 4 and the floppy disk drive 71. Attaching tongues 79a and 79b are formed integrally with the side plates 78c and 78d of the modem case 76. Those tongues 79a and 79b are secured together with the printed circuit board 8 to boss portions 80a and 80b of the bottom wall 6 by screws 81, whereby the modem case 76 is supported on the lower case 4.

An interconnection board 83 is fitted to the side plate 78c extending in the lengthwise direction of the modem case 76. The interconnection board 83 has a shape of an elongated belt extending along the entire side plate 78c, and has its peripheral portion detachably supported by a plurality of engaging pieces 84a to 84d protruding from the outer surface of the side plate 78c. The interconnection board 83 in this embodiment is a multi-layered board having a plurality of plates pressed, with a ground pattern provided between the stacked plates. The grand patterns are provided nearly across the front portion of the interconnection board 83.

As shown in FIGS. 10 through 13, the interconnection board 83 is held upright or held perpendicular to the printed circuit board 8 by using the side plate 78c of the modem case 76, and is located adjacent to the cut portion 8a of the printed circuit board 8. A plug-in type expansion connector 85 to which the modem 240 is to be connected is attached to one end portion of the interconnection board 83. The expansion connector 85 protrudes inside the modem case 76 via a cutaway 86 provided on the side plate 78c.

An inserting portion 88 extending downward is integrally formed at the bottom edge portion of one end of the interconnection board 83. A conductive portion 89 for the ground is formed on the outer surface of the inserting portion 88. The conductive portion 89 extends fully across the inserting portion 88 to be electrically connected to the ground pattern. A plug-in type keyboard connector 90 and a plug-in type first connector 91 for interconnection are attached to that outer surface of the interconnection board 83 which is located opposite to the modem case 76. A terminal portion 92a of a flexible board 92 led out from the keyboard unit 12 is detachably fitted in the keyboard connector 90. The keyboard connector 90 and the expansion connector 85 are electrically connected to the first connector 91 via the wiring pattern of the interconnection board 83.

The first connector 91 is located at the other end of the interconnection board 83 which is opposite to the inserting portion 88. A second connector 93 is located on that top of the printed circuit board 8 which faces the first connector 91. The first connector 91 is detachably connected to the second connector 93 from the top when the modem case 76 is placed on the bottom wall 6 of the lower case 4. This connection permits the keyboard unit 12, the modem 240 and the printed circuit board 8 to be electrically connected together.

A pair of clamping pieces 95a and 95b and a pair of clamping pieces 96a and 96b for clamping and holding the inserting portion 88 are protrusively provided on the bottom wall 6 of the lower case 4. The inserting portion 88 is detachably fitted between the clamping pieces 95a and 95b and between the clamping pieces 96a and 96b when the modem case 76 is placed on the bottom wall 6 of the lower case 4. Ground terminals 97 are located between the clamping piece pair 95a and 95b and the clamping piece pair 96a and 96b. The ground terminals 97 are electrically connected to the shield plate 70, and comes into contact with the conductive portion 89 of the interconnection board 83 when the modem case 76 is placed on the bottom wall 6 of the lower case 4.

As shown in FIGS. 11 and 12, the expansion space 75 and the power supply circuit portion on the printed circuit board 8 adjacent to that space are covered with a metal shield top plate 98 from the above. The shield top plate 98 has a substantially rectangular shape and has a conductive piece 99 formed at its periphery. This conductive piece 99 is in contact with the top edge portion of the side plate 70b of the shield plate 70. Accordingly, the shield plate 70 and shield top plate 98 surround the expansion space 75 and the power supply circuit portion while being electrically conductive.

An opening portion 100 is formed in the center portion of the shield top plate 98. The opening portion 100 is located directly above the keyboard connector 90, and the flexible board 92 is inserted and placed through the opening portion 100.

With the above structure, the elongated interconnection board 83 extending fully along the side plate 78c of the modem case 76 for storing the modem 240 is attached vertically upright. Further, the keyboard connector 90 to which the flexible board 92 of the keyboard unit 12 is connected, the first connector 91 for interconnection, to be connected to the second connector 93 on the printed circuit board 8, and the conductive portion 89, which comes in contact with the ground terminals 97, are provided on the side of the interconnection board 83. When the modem case 76 is placed on the bottom wall 6 of the lower case 4, therefore, the first connector 91 is fitted over the second connector 93 from the above, electrically connecting the printed circuit board 8, keyboard unit 12 and model 240 together and causing the ground conductive portion 89 of the interconnection board 83 to contact the ground terminals 97.

In this case, as the interconnection board 83 is arranged vertically upright with respect to the printed circuit board 8 and the bottom wall 6 of the lower case 4, the first connector 91 for interconnection can be arranged on the side of the modem case 76, whereby the printed circuit board 8 can be made more compact than in the case where the expansion connector 85 is arranged at the bottom of the modem case 76 and is connected directly to the second connector 93.

If the expansion connector 85 is arranged at the bottom of the modem case 76, the printed circuit board 8 should extend to the expansion space 75 defined by the modem case 76, so that a part of the printed circuit board 8 comes between the modem case 76 and the bottom wall 6 of the lower case 4. It is therefore necessary to secure space between the modem case 76 and the bottom wall 6, thus making the base unit 2 undesirably thicker.

According to the structure of this embodiment, on the other hand, the printed circuit board 8 need not extend to below the modem case 76, so that the modem case 76 can be arranged close to the bottom wall 6 of the lower case 4, making the base unit 2 thinner accordingly.

Further, as various connectors 85 and 90 can be arranged vertically along the side plate 78c of the modem case 76, the mounting density of components in the lower case 4 with the limited space can be improved. This also contributes to making the lower case 4 compact and thus making the base unit 2 compact.

Figure 14:
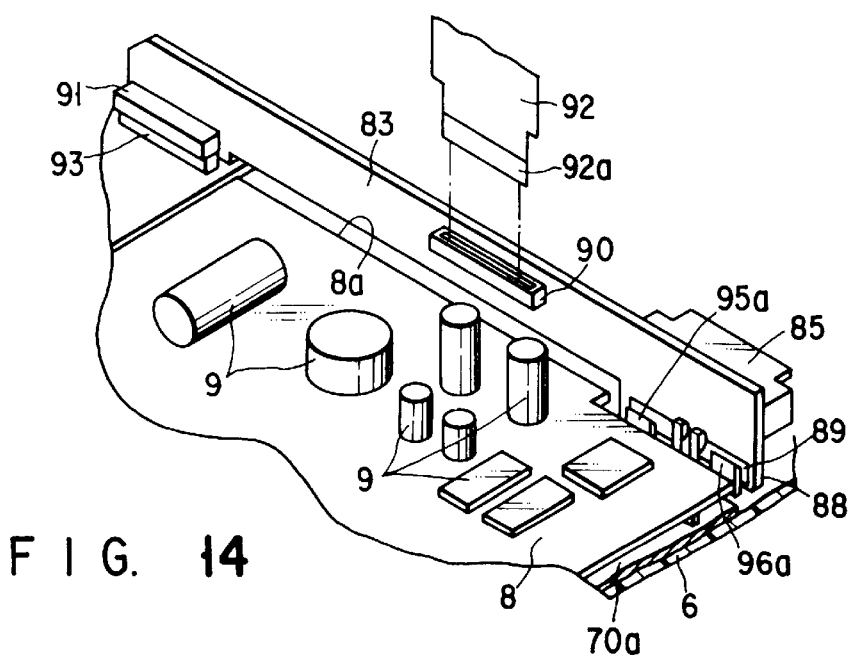

Referring additionally to FIGS. 13 and 14, the interconnection board 83 is detachably attachable by simple engagement with the engaging pieces 84a–84d of the modem case 76. To install the modem 240, therefore, the interconnection board 83 should be detached from the modem case 76 before the installment. Then, after the modem 240 is installed in the modem case 76, the interconnection board 83 is attached to the side 78a of the modem case 76 and the expansion connector 85 is connected to the modem 240. When the modem case 76 is placed at a predetermined position on the bottom wall 6 of the lower case 4 under this situation, the first connector 91 is connected to the second connector 93 and the ground conductive portion 89 of the interconnection board 83 comes in contact with the ground terminals 97.

Accordingly, electrical connection between the modem 240 and the printed circuit board 8 can be made by simply placing the modem case 76 at the predetermined position in the lower case 4, thus eliminating the need for a special flexible board and facilitating the installment of the modem 240.

Furthermore, as the interconnection board 83 is supported on the lower case 4 via the modem case 76, it is unnecessary to provide a special structure in the lower case 4 for supporting the interconnection board 83. This design can reduce the number of required parts and simplify the structure, and is very advantageous to making the lower case 4 compact.

In addition, as the interconnection board 83 intervenes between the modem 240 and the power supply circuit portion, the ground pattern lying nearly all over the interconnection board 83 prevents noise from the power supply circuit portion from interfering with that from the modem 240. This prevents amplification of the noise due to the noise interference, and can thus surely prevent noise leak to the outside with the help of the electromagnetic shielding effect of the shield plate 70 and the shield top plate 98.

As shown in FIGS. 2, 15 and 16, an attachment recess 110 as a storing position is formed in the lower case 4 of the base unit 2. A battery pack 111 as a pack unit is fitted in the attachment recess 110. The battery pack 111 serves as a driving power supply for the computer 1, and is designed into a unit of a single module. This battery pack 111 is detachably fitted in the attachment recess 110. A structure for fitting the battery pack 111 will now be described.

As shown in FIG. 15, the battery pack 111 has a case 112 of a synthetic resin, which contains a number of nickel—cadmium (Ni—Cd) batteries (not shown). This case 12 has a substantially rectangular parallelopiped main body 113a and an extending portion 113b protruding in the lengthwise direction of the main body 113a from one end of the main body 113a. One side of the extending portion 113b is flush with one side of the main body 113a, while the other side of the extending portion 113b is positioned away from the other side of the main body 113a. A step 114 is therefore formed between the other side of the extending portion 113b and the other side of the main body 113a.

As shown in FIGS. 15 and 17, positive and negative power terminals 115a and 115b are exposed from a bottom 112a of the case 112. The power terminals 115a and 115b are connected to the Ni—Cd batteries.

A top 116 of the case 112, which includes the extending portion 113b, forms a flat surface. When the battery pack 111 is held in the attachment recess 110 by four engaging portions which will be explained, this top 116 comes flush with the bottom wall 6 of the lower case 4, constituting part of the bottom wall 6. Formed at the peripheral portion of the top 116 are flange portions 117 which extend sideward from the side and end faces of the case 112. Of those flange portions 117, the flange portion 117a located on one end side along the length of the case 112 has a longer sideward extending length than the other flange portion 117.

An extending wall 118 bent substantially at right angles is formed at and fully across the distal end of the flange portion 117a. The extending wall 118 is substantially in parallel to one end face of the case 112. Projections 119a and 119b (FIG.18) respectively extending toward the left and right sides of the case 112, are provided on the left and right ends of the extending wall 118, respectively. The projections 119a and 119b extend in parallel to the top 116 of the case 112 at positions located away from the flange portions 117 and 117a toward the bottom 112a of the case 112. Element 121 (only one shown) forms the third engaging portion of the battery holding means as recesses are formed between the projections 119a and 119b and the flange portions 117. The third engaging portions 121 are open to the right and left sides of the case 112, and have their bottoms extending to the right and left sides of the case 112.

As shown in FIGS. 17 through 20, space 122 corresponding to the extending portion of the flange portion 117a is formed between the extending wall 118 and one end face of the case 112. A rib 123 extending lengthwise of the case 112 and an engaging projection 124 extending to be continuous to the rib 123 are protrusively provided on the back of the flange portion 117a which faces the space 122. The engaging projection 124 has a first engaging face 125 extending parallel to the extending wall 118 and a second engaging face 126 extending to be continuous to the first engaging face 125. The second engaging face 126 is inclined in a direction to acutely cross the engaging face 125 at the position closer to the other end side of the case 112 than the first engaging face 125.

Elements 127a, 127b and 127c each of a rectangular projection form the fourth engaging portion of the battery holding means and are protrusively provided on the end face of the main body 113a which faces the step 114 and the end face of the extending portion 113b. The protruding length of the fourth engaging portions 127a, 127b and 127c is set equal to or longer than that of the flange portions 117.

The attachment recess 110 where this type of battery pack 111 is to be fitted has a first recess 110a corresponding to the main body 113a of the battery pack 111 and a second recess 110b corresponding to the extending portion 113b. The second recess 110b is made narrower than the first recess 110a, and a right-angled corner 130 corresponding to the step 114 is formed at the boundary between the recesses 110a and 110b.

Referring additionally to FIG. 21, the attachment recess 110 further has a bottom opening portion 131 formed in the bottom wall 6 of the case 4, a bottom wall 132a which defines a ceiling surface and separates the bottom opening portion 131 from the interior of the base unit 2, a pair of side walls 132b and 132c facing each other, and an end wall 132d as a second side wall. The first recess 110a of the attachment recess 110 has a side opening portion 134 open in one side wall 7 of the lower case 4. The side opening portion 134 is continuous to the bottom opening portion 131. Of the opening edge portion of the side opening portion 131, an opening edge portion 134a parallel to the bottom wall 132a of the attachment recess 110 is located closer to the bottom wall 6 of the base unit 2 than the bottom wall 132a. When the battery pack 111 is fitted in the attachment recess 110, the side opening portion 134 is closed by the extending wall 118 of the case 112 and this extending wall 118 comes flush with the side wall 7 of the lower case 4 to thereby constitute part of the side wall 7.

A recess 135 where the flange portion 117 of the battery pack 111 is fitted is formed continuous to the opening edge portion of the attachment recess 110. The recess 135 has a depth corresponding to the thickness of the flange portion 117, and is continuous to the bottom wall 6 of the lower case 4.

Elements 137a and 137b form the first engaging portion of the holding means and are made of a pair of projections are protrusively provided on the left and right side walls 132b and 132c of the attachment recess 110. Those engaging portions 137a and 137b serve to accomplish the vertical positioning of the battery pack 111 in the attachment recess 110 when detachably engaged with the third engaging portions 121, and are provided at one end portion of the attachment recess 110 adjacent to the side opening portion 134.

As shown in FIGS. 17, 21 and 23, elements 138a, 138b and 138c of rectangular form the second engaging portion of the holding means and holes are formed in the end wall 132d of the attachment recess 110 and the end wall 130a of the corner portion 130. Front wall 200a forms a first partition in defining attachment recess 110. Together end walls 130a and 132d define a second partition, which, along with first partition 202a, further defines attachment recess 110. Those second engaging portions 138a, 138b and 138c serve as a second receiving portion and are detachably engaged with the fourth engaging portions 127a, 127b and 127c of the battery pack 111 to perform the vertical, positioning of the battery pack 111 in the attachment recess 110. The second engaging portions 138a, 138b and 138c are located on the end portion opposite to the first engaging portions 137a and 137b in the attachment recess 110.

As shown in FIGS. 16 and 17, four terminal holes 140a, 140b, 140c and 140d are bored in the bottom wall 132a of the attachment recess 110. Terminal fittings 141a, 141b, 141c and 141d are placed in those terminal holes 140a, 140b, 140c and 140d. The terminal fittings 141a, 141b, 141c and 141d are connected to the power supply circuit portion on the printed circuit board 8, and are exposed to the interior of the attachment recess 110 via the terminal holes 140a, 140b, 140c and 140d. When the battery pack 111 is attached to the attachment recess 110, the terminal fittings 141a 141b, 141c and 141d contact the power terminal plates 115a and 115b of the battery pack 111.

The battery pack 111 is to be fitted, tilted, in the attachment recess 110 through the bottom opening portion 131. As shown in FIGS. 17, 23 and 24 battery pack 111 has a first side wall 202a which faces the first partition, 200a, and a second side wall 202b and 202c facing the first side wall 202a. In this case, the entire length L1 of the attachment recess 110 is set longer than the entire length L2 of the case 112 of the battery pack 111 as shown in FIG. 24. With the battery pack 111 fully retained in the attachment recess 110, a sliding clearance S3 is secured between one end face of the battery pack 111 and the attachment recess 110. This clearance S3 is set larger than the extending length of the second engaging portions 127a, 127b and 127c.

As shown in FIGS. 16, 22 and 25, provided on the side wall 7 of the lower case 4 is a holding mechanism 145 for securely holding the battery pack 111 in the attachment recess 110. The holding mechanism 145 serving as a first receiving portion has a latch piece 146 protruding in the side opening portion 134. The latch piece 146 is secured to a slide plate 241, which is provided between the side wall 7 and the end wall of the attachment recess 110 to be freely slidable in a direction parallel to the bottom wall of the lower case 4. The slide plate 241 is urged by a compression spring 242 and is held together with the latch piece 146 at a hold position (to be described later). An engaging recess 244 is formed in the lower end portion of the slide plate 241.

As shown in FIG. 19, the latch piece 146 at the hold position enters the space 122 when the battery pack 111 is fitted into the attachment recess 110. The latch piece 146 has an inclined surface 147 facing the second engaging face 126 of the engaging projection 124 in the space 122 and an engaging face 148 parallel to the first engaging face 125. As shown in FIG. 20, when the engaging face 148 engages with the first engaging face 125, the movement of the battery pack 111 in the attachment recess 110 is inhibited.

The slide plate 241 is coupled to an operation knob 150 provided slidable on the outer surface of the side wall 7 of the lower case 4. As the slide plate 241 is slid in the direction of the arrow B (FIG. 19) against the urging force of the spring 242 by operating the knob 150, the latch piece 146 moves away from the engaging projection 124, disengaging the engaging face 148 from the first engaging face 125.

As shown in FIGS. 16, 22 and 25–27, a lock mechanism 246 for locking the slide plate 241 is provided on the side wall 7 of the lower case 4. The lock mechanism 246 has a lock member 248 provided between the side wall 7 and the end wall of the attachment recess 110. This lock member 248 is slidable in a direction perpendicular to the sliding direction of the slide plate 241 between a lock position indicated by a solid line and an unlock position indicated by a broken line in FIG. 25.

The lock member 248 has an engaging projection 250 engageable with the engaging recess 244 of the slide plate 241. When the lock member 248 is shifted to the lock position with the slide plate 241 set at the hold position, the engaging projection 250 engages with the recess 244, locking the slide plate 241 at the hold position. When the lock member 248 is shifted to the unlock position, on the other hand, the engaging projection 250 disengages from the recess 244, thus permitting free movement of the slide plate 241.

The lock member 248 also has a restricting projection 252 which is protrudable in the attachment recess 110 through the bottom wall 132a of the attachment recess 110. It is apparent from FIGS. 16 and 26 that at the lock position, the restricting projection 252 protrudes inside the attachment recess 110 to be positioned in the clearance S3 between the attachment recess 110 and the end face of the case 112 of the battery pack 111 installed in the attachment recess 110. Accordingly, the restricting projection 252 restricts the sliding movement of the battery pack 111 in the attachment recess 110 to prevent the battery pack 111 from accidentally coming out of the attachment recess 110. At the lock position, the restricting projection 252 moves away from the attachment recess 110.

The lock member 248 has an operation knob 254, which penetrates the side wall 7 to be exposed outward from the outer surface of the lower case 4. The lock member 248 is therefore externally manipulatable through the operation knob 254.

A description will now be given of how the battery pack 111 is fitted into the attachment recess 110 of the base unit 2.

First, with the display unit 3 closed, the base unit 2 is turned over, with the bottom wall 6 of the lower case 4 facing upward, to expose the attachment recess 110, as shown in FIG. 2.

In this situation, the battery pack 111 is inserted, tilted, into the bottom opening portion 131 of the attachment recess 110, placing the extending portion 113b first, so that the flange portion 117 at the inserting front end portion of the extending portion 113b comes in contact with the recess 135 at the opening edge of the bottom opening portion 131. It is to be noted that the lock member 248 of the lock mechanism 246 should be shifted to the unlock position in advance. When the inserting front end portion of the extending portion 113b comes in contact with end face of the second recess 110b of the attachment recess 110, the battery pack 111 is twisted downward with this contact point as a fulcrum so as to rest at the attachment recess 110 as shown in FIG. 23. At this time, as the entire length L1 of the attachment recess 110 is set longer than the entire length L2 of the battery pack 111, the inserting rear end portion of the battery pack 111 will not abut on the opening edge portion 134a of the side opening portion 134. Consequently, the bottom 112a of the case 112 of the battery pack 111 contacts the bottom wall 132a of the attachment recess 110 and the top 116 of the case 112 comes flush with the bottom wall 6 of the lower case 4.

With the battery pack 111 resting in the attachment recess 110, the inserting rear end portion of the battery pack 111 is slightly protruding from the side opening portion 134 of the recess 110. Once the battery pack 111 is placed in the attachment recess 110, therefore, the extending wall 118 of the battery pack 111 is pushed in the side opening portion 134 to linearly slide the battery pack 111 in the attachment recess 110.

As a result, the third engaging portions 121 at the left and right sides of the battery pack 111 respectively engage with the first engaging portions 137a and 137b of the attachment recess 110. At the same time, the fourth engaging portions 127a, 127b and 127c positioned at the inserting front end of the battery pack 111 engage with the second engaging portions 138a, 138b and 138c of the attachment recess 110. Consequently, the battery pack 111 is placed completely in the attachment recess 110 so that the extending wall 118 comes flush with the side wall 7 of the lower case 4.

When the battery pack 111 is placed in the attachment recess 110 110, the latch piece 146 enters the space 122 of the battery pack 111 as shown in FIG. 19, so that the inclined surface 147 of the latch piece 146 contacts the second engaging face 126 of the engaging projection 124. When the battery pack 111 is slid in the above-described manner in this situation, the engaging projection 124 moves in the direction of the arrow A in FIG. 19. As a result, the inclined second engaging face 126 pushes the latch piece 146 to forcibly move it against the urging force of the spring 242 in the direction of the arrow B so that the latch piece 146 is disengaged from the engaging projection 124. When the second engaging face 126 of the engaging projection 124 slides over the inclined surface 147 by the sliding of the battery pack 111, the latch piece 146 returns to the hold position shown in FIG. 20 by the urging force of the spring 242, so that the first engaging face 125 of the engaging projection 124 is hooked by the engaging face 148 of the latch piece 146.

When the lock member 248 is shifted to the lock position in this state, the engaging projection 250 engages with the engaging recess 244 of the slide plate 241, locking the latch piece 146 at the hold position. At the same time, the restricting projection 252 of the lock member 248 protrudes in the attachment recess 110 to be positioned in the clearance S3.

Accordingly, the reverse sliding of the battery pack 111 is inhibited by the latch piece 146 and the restricting projection 248, so that the battery pack 111 is securely fitted to the attachment recess 110. In this condition, the power terminals 115a and 115b of the battery pack 111 contact the terminal fittings 141a, 141b, 141c and 141d of the attachment recess 110 as shown in FIG. 24, thus ensuring electric connection of the battery pack 111 to the power supply circuit portion on the printed circuit board 8.

To detach the battery pack 111 from the attachment recess 110, third, the operation knob 254 is manipulated with fingers to shift the lock member 248 to the unlock position to unlock the slide plate 241 and move the restricting projection 252 away from the attachment recess 110. Then, the operation knob 150 is slid to disengage the latch piece 146 from the engaging projection 124. This releases the holding of the battery pack 111 so that the top 116 of the battery pack 111 is pushed with fingers to slide the battery pack 111 toward the side opening portion 134. As a result, the third engaging portions 121 are disengaged from the first engaging portions 137a and 137b, and the fourth engaging portions 127a, 127b and 127c from the second engaging portions 138a, 138b and 138c, causing one end portion of the battery pack 111 to protrude from the side opening portion 134. The battery pack 111 is to be twisted upward by holding this protruding portion with fingers. Now the battery pack 111 can be pulled out from the attachment recess 110.

According to the thus constituted computer 1, after the battery pack 111 is seated in the attachment recess 110, it is slid along the bottom wall 132a of the attachment recess 110 so that both lengthwise end portions of the battery pack 111 are engaged with the attachment recess 110. The large and heavy battery pack 111 can be securely held in the attachment recess 110 while being supported at the both ends.

Even when the entire weight of the battery pack 111 is applied to the engaging portion with the attachment recess 110 as in the case where the compute 1 is lifted, the engaging portion will not be deformed or damaged, so that the battery pack 111 can be securely held in the attachment recess 110. As the battery pack 111 is secured to the attachment recess 110 and locked there by both the latch piece 146 and restricting projection 248, firm holding and sure locking are accomplished and no load will not act on one of the latch piece and the restricting projection, thus preventing those members from being damaged by the weight of the battery pack 111.

Further, since the attachment recess 110 has the side opening portion 134 which is continuous and open to the side wall 7 of the lower case 4, simply pushing the protruding portion of the battery pack 111 from the side opening portion 134 can slide the battery pack 111 in the attachment recess 110. In other words, it is unnecessary to put fingers inside the attachment recess 110 to slide the battery pack 111, thus eliminating the need for extra space for such action. Even though the battery pack 111 is slidable in the attachment recess 110, the mounting space for the battery pack 111 is not increased, thus contributing to making the base unit 2 compact.

Although the foregoing description of this embodiment has been given with a battery pack explained as a pack unit, the pack unit is in no way limited to the battery pack, but may be an optional unit for expansion such as a hard disk drive.

The compact electronic apparatus according to this invention is not limited to a book type personal computer, but may be applied to other electronic apparatuses, such as a word processor, as well.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A compact electronic apparatus comprising:
    a base unit having a bottom wall and a side wall extending to the bottom wall and accommodating electronic components, the base unit having an attachment recess having a bottom opening portion formed in the bottom wall and a side opening portion formed in the side wall to communicate with the bottom opening portion, and a plurality of partitions for defining the attachment recess, which include a first partition adjacent to and facing the side wall and a second partition facing the first partition at a first distance therebetween;
    a pack unit adapted to be detachably fitted in the attachment recess and having a first side wall facing the first partition, a second side wall facing the first side wall at a second distance therebetween shorter than the first distance, and an outer wall for constituting a part of the bottom wall when the pack unit is fitted in the attachment recess, the pack unit being movable in the attachment recess between a detaching position and a securing position spaced apart from the detaching position by a predetermined distance substantially equal to a difference between the first and second distances; and
    holding means for holding the pack unit in the attachment recess, said holding means including,
        a first engaging portion provided adjacent to the side opening portion in the attachment recess,
        a second engaging portion provided on the second partition,
        third and second engaging portions, provided at the pack unit, for engagement with the first and second engaging portions respectively when the pack unit is shifted to the securing position from the detaching position in the attachment recess, and
        securing means for securing the pack unit in the securing position.

2. An apparatus according to claim 1, wherein said first and second engaging portions respectively have engaging recesses having a depth substantially equal to the predetermined distance, and said third and fourth engaging portions respectively have engaging projections having a height substantially equal to the predetermined distance.

3. An apparatus according to claim 1, wherein said pack unit has an extending wall which protrudes from the first side wall, and closes the side opening portion and constitutes a part of the side wall of the base unit at the securing position.

4. An apparatus according to claim 3, wherein said third engaging portion is formed on the extending wall.

5. An apparatus according to claim 1, wherein said securing means includes:
    a retaining portion provided on the pack unit in a vicinity of the first side wall; and
    a latch member, protruding in the side opening portion and provided on the base unit in such a way as to be movable between a hold position where the latch member is engaged with the retaining portion of the pack unit positioned at the securing position and a disengaging position where the latch member is disengaged from the retaining portion.

6. An apparatus according to claim 5, wherein said holding means includes means for locking the latch member at the hold position, the lock means having a lock member provided on the base unit to be slidable between a lock position where the lock member is engaged with the latch member positioned at the hold position to restrict movement of the latch member, and an unlock position where the lock member is disengaged from the latch member to permit movement of the latch member.

7. An apparatus according to claim 6, wherein said lock member has a restricting portion, which projects between the first side wall of the pack unit and the first partition to restrict movement of the pack unit at the lock position and moves away from between the first side wall and the first partition at the unlock position.

8. A compact electronic apparatus comprising:
    a base unit including a bottom surface, an opening in the bottom surface, and a storing portion provided in the base unit and communicating with the opening, the storing portion including a first side wall having a first receiving portion and a second side wall facing the first side wall and having a second receiving portion;
    a pack unit detachably stored in the storing portion, and including an outer surface, a first engaging portion removably engaged with the first receiving portion and a second engaging portion removably engaged with the second receiving portion, the pack unit being movable in the storing portion, in a direction substantially parallel to the bottom surface and across the first and second side walls, between a detaching position wherein the pack unit is installed in the storing portion and a connecting position wherein the first and second engaging portions are engaged with the first and second receiving portions, respectively, the outer surface being flush with the bottom surface and covering the opening when the pack unit is in the connecting position; and
    lock means provided at the base unit, for locking the pack unit in the connecting position.

9. A compact electronic apparatus according to claim 8, wherein the storing portion includes a ceiling surface having first terminals, and the pack unit includes a third side wall having a third engaging portion, and an upper surface facing the ceiling surface and having second terminals which are connected to the first terminals when the pack unit is in the connecting position.

10. A compact electronic apparatus according to claim 9, wherein the third side wall includes an extending wall having the third engaging portion.

11. A compact electronic apparatus according to claim 10, wherein the first receiving portion includes a sliding member being slidable between a remove position wherein the sliding member allows the pack unit to move to the connecting position and an engaging position wherein the sliding member is engaged with the first engaging portion.

12. A compact electronic apparatus according to claim 11, wherein the lock means includes a locking member provided on the first side wall and movable between a locking position wherein the locking member locks the sliding member in the locking position and a release position wherein the locking member allows the sliding member to move.

13. A compact electronic apparatus comprising:
    a base unit including a bottom surface, an opening in the bottom surface, and a storing portion having a ceiling wall, a first side wall, and a second side wall facing the first side wall, the first side wall having a side opening and a first receiving portion, the second side wall having a second receiving portion;

a pack unit including an outer surface, a third side wall, an extending wall extending from the first side wall and having a first engaging portion, and a fourth side wall facing the third side wall and having a second engaging portion, the pack unit being movable in the storing portion, in a direction substantially parallel to the bottom surface and across the first and second side walls, between a detaching position wherein the detachable pack unit is installed on the ceiling wall and a connecting position wherein the first and second engaging portions are engaged with the first and second receiving portions, respectively, the outer surface being flush with the bottom surface and the side opening being covered with the extending wall when the pack unit is in the connecting position; and first locking means provided at the base unit, for locking the first receiving portion with the first engaging portion, and second locking means provided at the base unit, for engaging between the first side wall and the third side wall of the pack unit located in the connecting position and preventing the pack unit from moving from the connecting position to the detaching position.

14. A compact electronic apparatus according to claim 13, wherein the pack unit has an upper wall facing the ceiling wall when the pack unit is stored in the storing portion, and a first terminal provided on the upper wall, the ceiling wall has a second terminal which is connected to the first terminal when the pack unit is in the connecting position.

15. A compact electronic apparatus according to claim 14, wherein the second receiving portion includes a recess, the second engaging portion includes a protruding portion which is engaged with the recess when the pack unit is in the connecting position.

16. A compact electronic apparatus according to claim 15, wherein the first receiving portion includes a sliding member being slidable between a remove position wherein the sliding member allows the pack unit to move toward the connecting position and an engaging position wherein the sliding member is engaged with the first engaging portion.

17. A compact electronic apparatus according to claim 16, wherein the first locking means includes a locking member provided on the first side wall and movable between a locking position wherein the locking member locks the sliding member in the locking position and a release position wherein the locking member releases the lock of the sliding member, and the second locking means includes a projection protruding from the locking member, for fitting between the first side wall and the third side wall of the pack unit located in the connecting position.

18. A compact electronic apparatus according to claim 17, wherein the pack unit includes a battery pack.

* * * * *